United States Patent
Fujii et al.

(10) Patent No.: US 8,261,027 B2
(45) Date of Patent: Sep. 4, 2012

(54) STATE TRANSITION MANAGEMENT DEVICE AND METHOD

(75) Inventors: Taro Fujii, Kanagawa (JP); Toshirou Kitaoka, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 593 days.

(21) Appl. No.: 12/461,434

(22) Filed: Aug. 11, 2009

(65) Prior Publication Data

US 2010/0042803 A1 Feb. 18, 2010

(30) Foreign Application Priority Data

Aug. 12, 2008 (JP) .................................. 2008-207973

(51) Int. Cl.
*G06F 12/02* (2006.01)
(52) U.S. Cl. .................................. 711/154; 711/E12.002
(58) Field of Classification Search .................. None
See application file for complete search history.

(56) References Cited

U.S. PATENT DOCUMENTS 6,738,891 B2   5/2004   Fujii et al.

FOREIGN PATENT DOCUMENTS

| JP | 3-282602 | 12/1991 |
| JP | 2001-312481 | 11/2001 |

*Primary Examiner* — Kevin Verbrugge
(74) *Attorney, Agent, or Firm* — McGinn IP Law Group, PLLC

(57) ABSTRACT

A state transition management device includes a memory that stores subsequent state number candidates for a current state number and a selection circuit that selects a subsequent state number from among the subsequent state number candidates that have been read out from the memory. For the state number having the subsequent state number candidates that are branch destinations of the current state number and are small in number, the memory stores the subsequent state number candidates for a plurality of current state numbers at one address in the memory that can be concurrently read out. The selection circuit selects the subsequent state number based on an event identification code (109, 110) and a current state number.

10 Claims, 25 Drawing Sheets

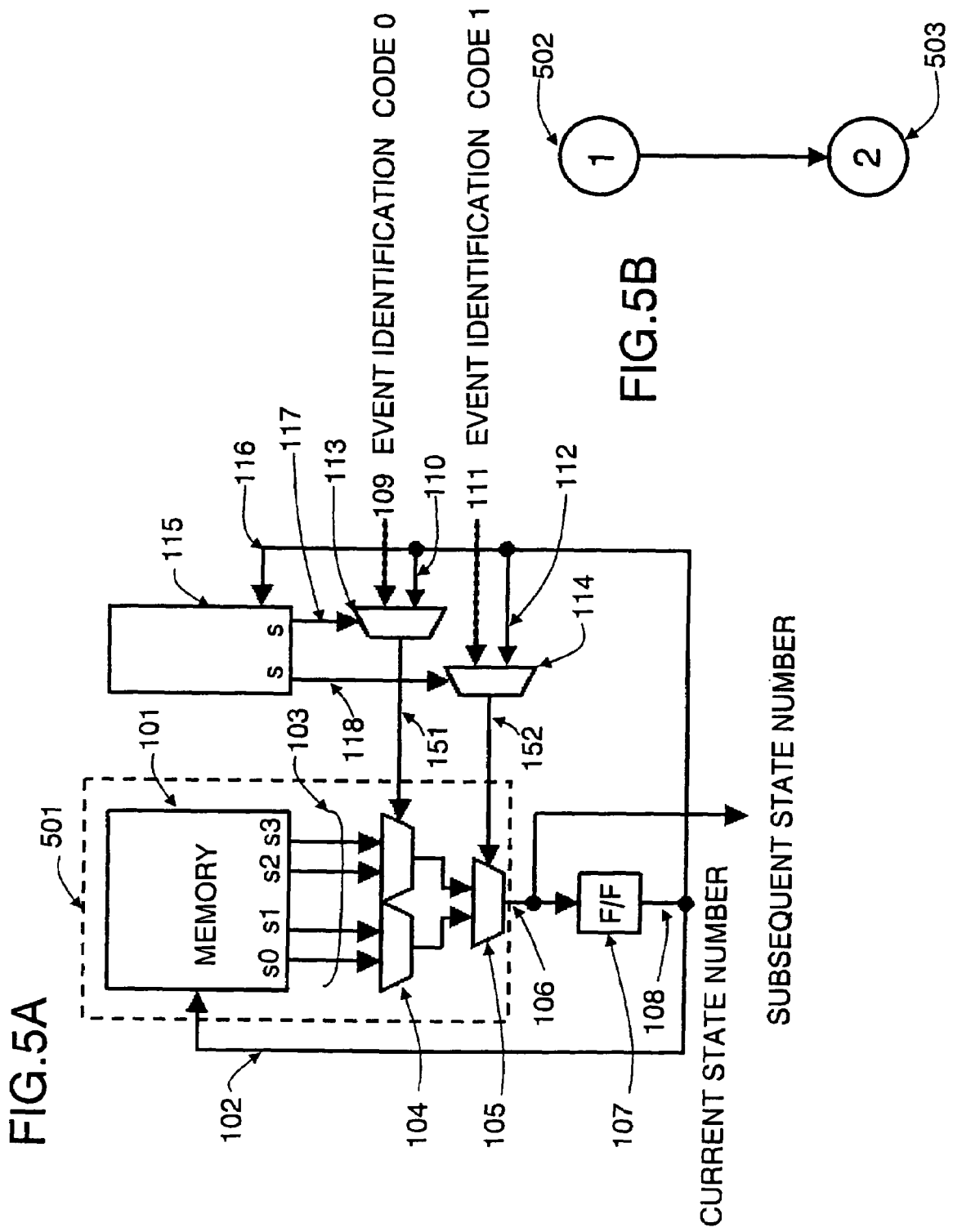

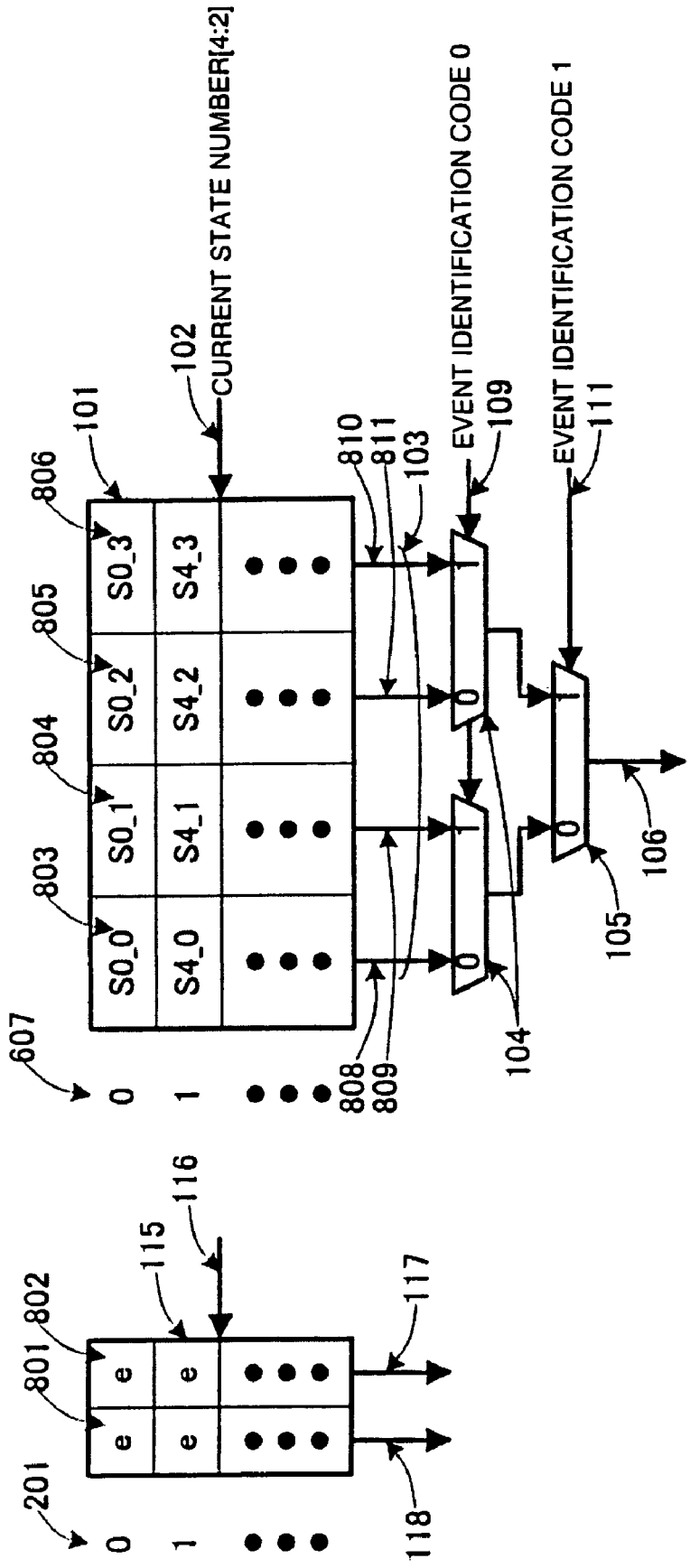

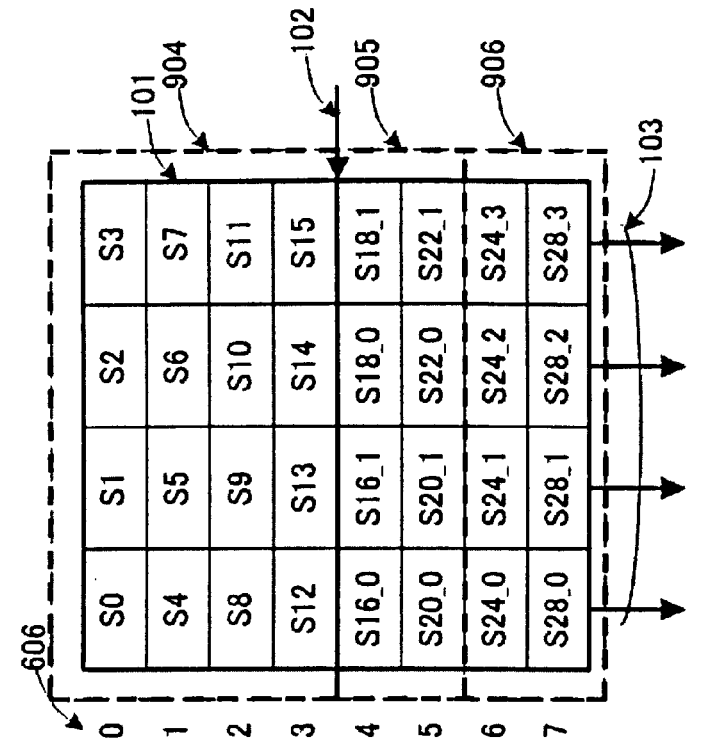
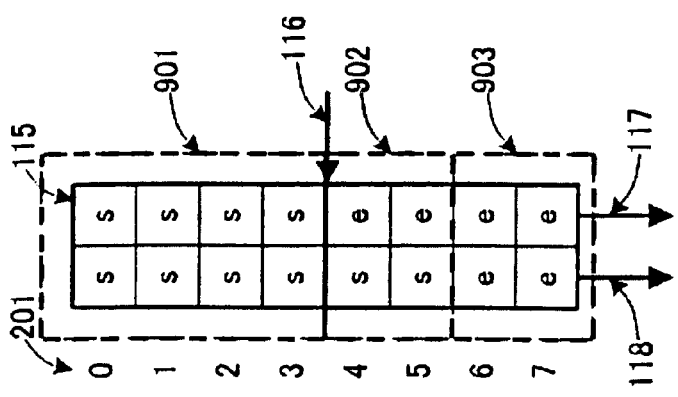

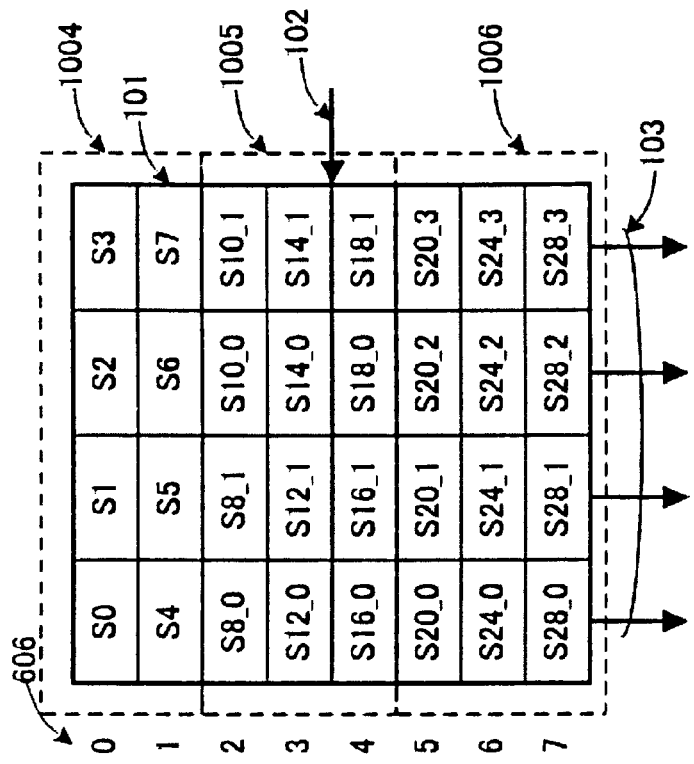
FIG. 10B
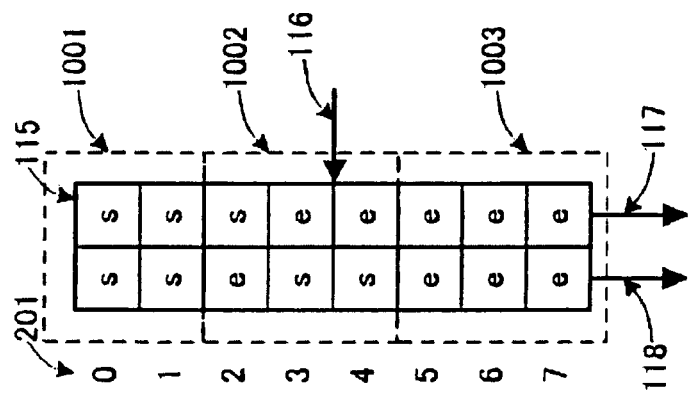
FIG. 10A
FIG. 10C
| NUMBER OF BRANCHES | CURRENT STATE NUMBER |
|---|---|
| 1 | 0~7 |
| 2 | 8,10,12,14,16,18 |
| 4 | 20,24,28 |

STATE TRANSITION MANAGEMENT MECHANISM

STATE TRANSITION DIAGRAM

STATE TRANSITION MANAGEMENT DEVICE AND METHOD

TECHNICAL FIELD

Reference to Related Application

This application is based upon and claims the benefit of the priority of Japanese patent application No. 2008-207973, filed on Aug. 12, 2008, the disclosure of which is incorporated herein in its entirety by reference thereto.

The present invention relates to a state transition management device and a state transition management method thereof. More specifically, the invention relates to a state transition management device and a state transition management method thereof used in a digital circuit such as an LSI.

BACKGROUND

Along with advancement of a digital technology in recent years, a lot of programmable devices are used. In the programmable devices, operations can be determined by a program after manufacture of an LSI. In an array-type processor described in Patent Document 1, which is one of the programmable devices, an application to be loaded therein is separated into a part for state transition and a part for a data bus, thereby implementing an operation of hardware with a configuration suited to each part.

As shown in FIG. 15 in Patent Document 1, a state transition management device that implements this state transition stores a state transition rule in a memory (table) within the state transition management device. Then, the state transition management device selects one of a plurality of subsequent state number candidates for a next state that are output when a state number is supplied to this memory according to an event identification code. Details of the state transition management device will be described, using an example.

FIG. 25A shows a state transition diagram to be used as an example. A numeral in a circle indicates a state number. Transition can be made to only a state indicated by an arrow. A character added to the arrow indicates a condition (event identification code) for proceeding to the arrow. In the case of FIG. 25A, when transition is set to be started from a state 0, the transition is made to a state 1 due to input of an event identification code e0. Then, three transition destinations (branches) of states 2, 3, and 4 are present for the state 1. Then, it is shown that when the event identification code e0 is supplied, the transition proceeds to the state 2, when an event identification code e1 is supplied, the transition proceeds to the state 3, and when an event identification code e2 is supplied, the transition proceeds to the state 4. Likewise, from then on, the transition is made from the state 2 to a state 5 according to the event identification code e0, and the transition is made from the state 3 to the state 5 according to the same event identification code e0. There are two states of the state 5 and a state 6 as a state next to the state 4. When the event identification code e0 is supplied, the transition is made to the state 5. When the event identification code e1 is supplied, the transition is made to the state 6. In the case of the state 5, the transition is made to the state 6 according to the event identification code e0.

Next, an example of the state transition management device that implements the state transition diagram in FIG. 25A will be shown in FIG. 25B. First, when a current state number 2501 is supplied to a memory 2502, four subsequent state number candidates are output as outputs 2503 according to the input value of the current state number 2501. One of the four subsequent state numbers is selected by a selector 2505, using an event identification code 2504, and a subsequent state number 2506 is then output. The subsequent state number 2506 becomes the current state number 2501 in a next clock cycle, and is supplied to the memory 2502 to determine a subsequent state number. Such an operation is repetitively performed. State transition is thereby continuously made.

The state transition will be described, using an operation example. First, an operation of transition to the state 1 when the event identification code e0 is supplied in the state 0, which is shown within the framework of a block 2508 in FIG. 25A will be described.

In this case, a value 0 is supplied as an input of the current state number 2501. Thus, values in a row corresponding to the value 0 in a column 2507 of the memory 2502 or the values within the framework of a block 2509 are output as the outputs 2503. Since the event identification code e0 is supplied as the event identification code 2504. Thus, a value of 1 in column e0 is selected by the selector 2505 to become a subsequent state number 2506.

Next, an operation of transition to each of the states 2, 3, and 4 when one of event identification signals e0, e1, and e2 is supplied in the state 1, shown in the framework of a block 2510 in FIG. 25A, will be described. In this case, a value 1 is supplied as an input of the current state number 2501. Thus, values in a row corresponding to the value 1 in the column 2507 of the memory 2502 or the values within the framework of a block 2511 are output as the outputs 2503. When the event identification code e0 is then supplied as the event identification code 2504, a value 2 in the e0 column is selected by the selector 2505 to become the subsequent state number 2506. When the event identification code e1 is supplied, a value 3 in an e1 column is selected by the selector 2505 to become the subsequent state number 2506. When the event identification code e2 is supplied, a value 4 in an e2 column is selected by the selector 2505 to become the subsequent state number 2506.

An operation of transition to each of the states 4 and 5, shown in the framework of a block 2512 in FIG. 25A, will be described as another example. The transition is made to the state 5 when the event identification signal e0 is supplied in the state 4. The transition is made to the state 6 when the event identification signal e1 is supplied in the state 4. In this case, the value 4 is supplied as an input of the current state number 2501. Thus, values in a row corresponding to the value 4 in the column 2507 of the memory 2502 or the values within the framework of a block 2513 are output as the outputs 2503. When the event identification code e0 is then supplied as the event identification code 2504, a value 5 in the e0 column is selected by the selector 2505 to become the subsequent state number 2506. When the event identification code e1 is supplied, a value 6 in the e1 column is selected by the selector 2505 to become the subsequent state number 2506.

In the memory that implements implementation of this state transition management device, an input of the current state number 2501 may be considered as an address input. The outputs 2503 of a plurality of subsequent number candidates may be considered as data outputs.

[Patent Document 1]
  JP Patent No. 3674515, which corresponds to US Patent Publication No. US-2001/0018733A1
[Patent Document 2]
  JP Patent Kokai Publication No. JP-A-3-282602

SUMMARY

The disclosure of the above Patent Documents are incorporated herein by reference thereto. Now, the following analyses are given by the present invention.

However, the state transition management device disclosed in Patent Document 1 has a problem in terms of efficiency of use of the internal memory. When accommodation to various state transition diagrams is considered in view of a programmable characteristic, it is preferable that the number of implementable states and the number of branches of the state transition management device are large. However, the data bit widths of common memories used for storing the state transition rule are all equal for each address. This means that the number of the subsequent state number candidates (data bit width) is fixed, without depending on an input of the current state number (address). Accordingly, it is necessary to increase the size of the memory that constitutes the state transition management device in an address direction in order to increase the number of the states that can be loaded. Likewise, it is necessary to increase the size of the memory in a bit width direction, in order to increase the number of branches that can be loaded.

However, as shown in the example in FIGS. 25A and 25B, the number of branches differs for each state, and there may often happen case where there are not many states where a lot of the branches are used. For this reason, in the case of the state transition management device where the number of possible branches is the same in all of the states, a lot of memory portions that are not used in the state transition table (blank portions in FIG. 25B) would be produced.

Assume that a common memory is used to set its size in the address direction to the number of implementable states and set its size in the bit width direction to the number of the states that can be branched. Then, as described above, there is the problem that the efficiency of use of the memory which forms the state transition management device is not good.

According to a first aspect (aspect) of the present invention, there is provided a state transition management device including a memory, a selection method specifying unit, and a selection circuit. The memory stores a state transition rule and from which a plurality of subsequent state number candidates are read out when the memory receives a first signal based on a state number as an address. The selection method specifying unit outputs a selection method specifying signal upon reception of a second signal based on the state number. The selection circuit receives the selection method specifying signal read out from the selection method specifying unit, a signal based on an event, and a third signal based on the state number, and selects a subsequent state number from the plurality of subsequent number candidates.

According to another aspect of the present invention, there is provided a state transition management method of a state transition management device that uses a memory from which a plurality of subsequent state number candidates that may be a subsequent state number are read out when an address based on a current state number is given and selects the subsequent state number from among the plurality of subsequent state number candidates based on an event supplied from an outside when the plurality of subsequent state number candidates are present for the state number. In case where the address for the state number having the subsequent state number candidates that are small in number is given, the method is performed as follows. Subsequent state number candidates for a plurality of state numbers are read out from the memory. The subsequent state number candidates for the plurality of state numbers are narrowed down to subsequent state number candidates for the current state number, based on at least a part of bits of the current state number. And the subsequent state number is selected from among the subsequent state number candidates for the current state number, based on the event.

The meritorious effects of the present invention are summarized as follows.

According to the present invention, one or a plurality of subsequent state number candidates for each of a plurality of state numbers (current state numbers) can be stored in a range that can be read in one time access to the memory. The efficiency of use of the memory can be thereby enhanced.

BRIEF DESCRIPTION OF THE DRAWINGS

FIGS. 5A and 5B are diagrams explaining a 1-way branching operation in the first exemplary embodiment of the present invention;

FIGS. 8A and 8B are diagrams explaining operations of the memory 101 and the selection method specifying unit 115 at a time of the 1-way branching operation in the first exemplary embodiment of the present invention;

FIGS. 9A, 9B, 9C, and 9D are diagrams showing an internal configuration example when information in the case of 1-way branching, 2-way branching, and 4-way branching is concurrently stored in the first exemplary embodiment of the present invention;

FIGS. 10A, 10B, and 10C are diagrams showing an internal configuration example different from that in FIGS. 9A to 9D when information in the case of 1-way branching, 2-way branching, and 4-way branching is concurrently stored in the first exemplary embodiment of the present invention;

PREFERRED MODES

Figure 1:
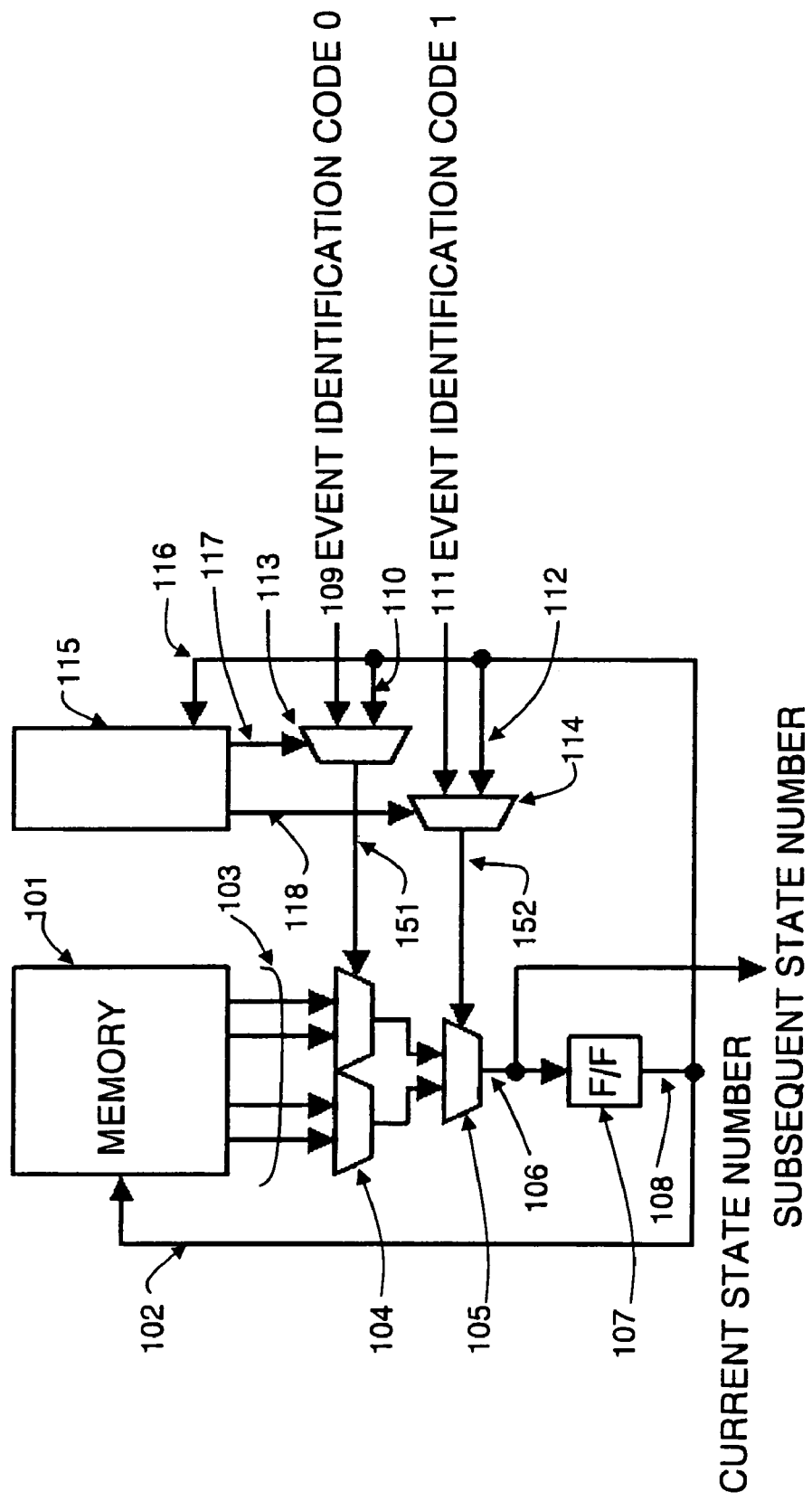
FIG. 1 is a block diagram showing a configuration of a first exemplary embodiment of the present invention.

An overview of exemplary embodiments of the present invention will be described with reference to drawings as necessary.

As shown in FIGS. 1, 14, 16, and 19, a state transition management device in an exemplary embodiment includes a memory (101, 1401), a selecting method specifying unit (115, 1502 in FIG. 15), and a selection circuit (104, 105, 113, 114). The memory (101, 1401) stores a state transition rule, and from which a plurality of subsequent state number candidates 103 are read when the memory receives a first signal (102, 1402) based on a state number (108, 106, 1607) as an address. The selection method specifying unit (115, 1502 in FIG. 15) outputs a selection method specifying signal (117, 118) upon reception of a second signal (116, 1402) based on the state number. The selection circuit (104, 105, 113, 114) receives the selection method specifying signal (117, 118) read out from the selection method specifying unit (115, 1502 in FIG. 15), a signal (109, 111) based on an event, and a third signal (110, 112) based on the state number (108, 106, 1607), and The selection circuit (104, 105, 113, 114) selects the subsequent state number (106, 1607) from the plurality of subsequent state number candidates 103.

With the arrangement described above, the number of words of the memory needed by the state transition management device can be reduced. That is, the number of transition source states included in the subsequent state number candidates 103 concurrently output from the memory can be changed according to a current state number. With this arrangement, while 1 word of the memory corresponds to 1 current state number in a conventional art, a plurality of current state numbers can be made to correspond to the 1 word in the method of the present invention. Thus, the number of words of the memory that are needed can be reduced.

Further, with the arrangement described above, various combinations of the number of implementable states and the number of branches can be obtained. That is, by allowing the number of a combination of transition source states included in the 1 word of the memory to be changed, the various combinations can be obtained. When the number of branches is small, the number of a combination of states in the 1 word can be increased. When the number of branches is large, the number of the combination of states in the 1 word can be reduced.

Further, as shown in FIGS. 1, 14, 16, and 19, in the state transition management device in the exemplary embodiment, each of the first signal (102, 1402) and the second signal (116, 1402) may indicate a part of bits of the state number (108, 106, 1607). The third signal (110, 112) may indicate bits of the state number (108, 106, 1607) that are different from parts of bits of the first signal (102, 1402) and the second signal (116, 1402). The signal (109, 111) based on the event may indicate an event identification code.

As shown in FIGS. 1, 14, 16, and 19, the selection circuit (104, 105, 113, 114) in the state transition management device in the exemplary embodiment may include a selection signal generation unit (113, 114) and a subsequent state number selection unit (104, 105). The selection signal generation unit (113, 114) receives the signal (109, 111) based on the event, the third signal (110, 112), and the selection method specifying signal (117, 118), thereby generating a selection signal (151, 152) from the signal (109, 111) based on the event and the third signal (110, 112), based on the selection method specifying signal (117, 118). The subsequent state number selection unit (104, 105) selects the subsequent state number 106 from the plurality of subsequent state number candidates 103, based on the selection signal (151, 152).

Further, as shown in FIGS. 1, 14, 16, and 19, in the state transition management device in the exemplary embodiment, each of the signal (109, 111) based on the event, the third signal (110, 112), and the selection method specifying signal (117, 118) may be a signal formed of a plurality of bits. The selection signal generation unit (113, 114) may include a plurality of selection signal selectors (113, 114) connected in parallel. Each of the selection signal selectors (113, 114) may be a selector circuit (113, 114) that receives a part of the bits of the signal (109, 111) based on the event, a part of the bits of the third signal (110, 112), and a part of the bits of the selection method specifying signal (117, 118), and selects and outputs the part of the bits of the signal (109, 111) based on the event or the part of the bits of the third signal (110, 112), based on the part of the bits of the selection method specifying signal (117, 118). The subsequent state number selection unit (104, 105) may include a plurality of subsequent state number selectors (104, 105) connected in multiple stages. Each of the subsequent state number selectors (104, 105) may be a subsequent state number selector that narrows down the plurality of subsequent state number candidates 103 based on one of output signals (151, 152) of the selection signal selectors. One selector 105 of the subsequent state number selectors in a final stage may select and outputs the subsequent state number 106.

Further, as shown in FIGS. 1, 14, 16, and 19, in the state transition management device in the exemplary embodiment, when the first signal (102, 1402) is supplied as the address in at least a portion (904, 905 in FIG. 9B, 1004, 1005 in FIG. 10B, 1103, 1104 in FIG. 11B, 1201, 1202 in FIG. 12B, 0th to 5th rows in FIG. 15, 1802, 1803 in FIG. 18, 2002, 2003 in FIG. 21) of the memory (101, 1401), the plurality of subsequent state number candidates 103 for a plurality of state numbers may be read out. Then, the selection circuit (104, 105, 113, 114) may select the subsequent state number candidates for the current state number from among the subsequent state number candidates 103 for the plurality of state numbers according to the third signal (110, 112), and may select the subsequent state number for the current state number from among the subsequent state number candidates for the current state number, according to the signal (109, 111) based on the event.

Figure 16:
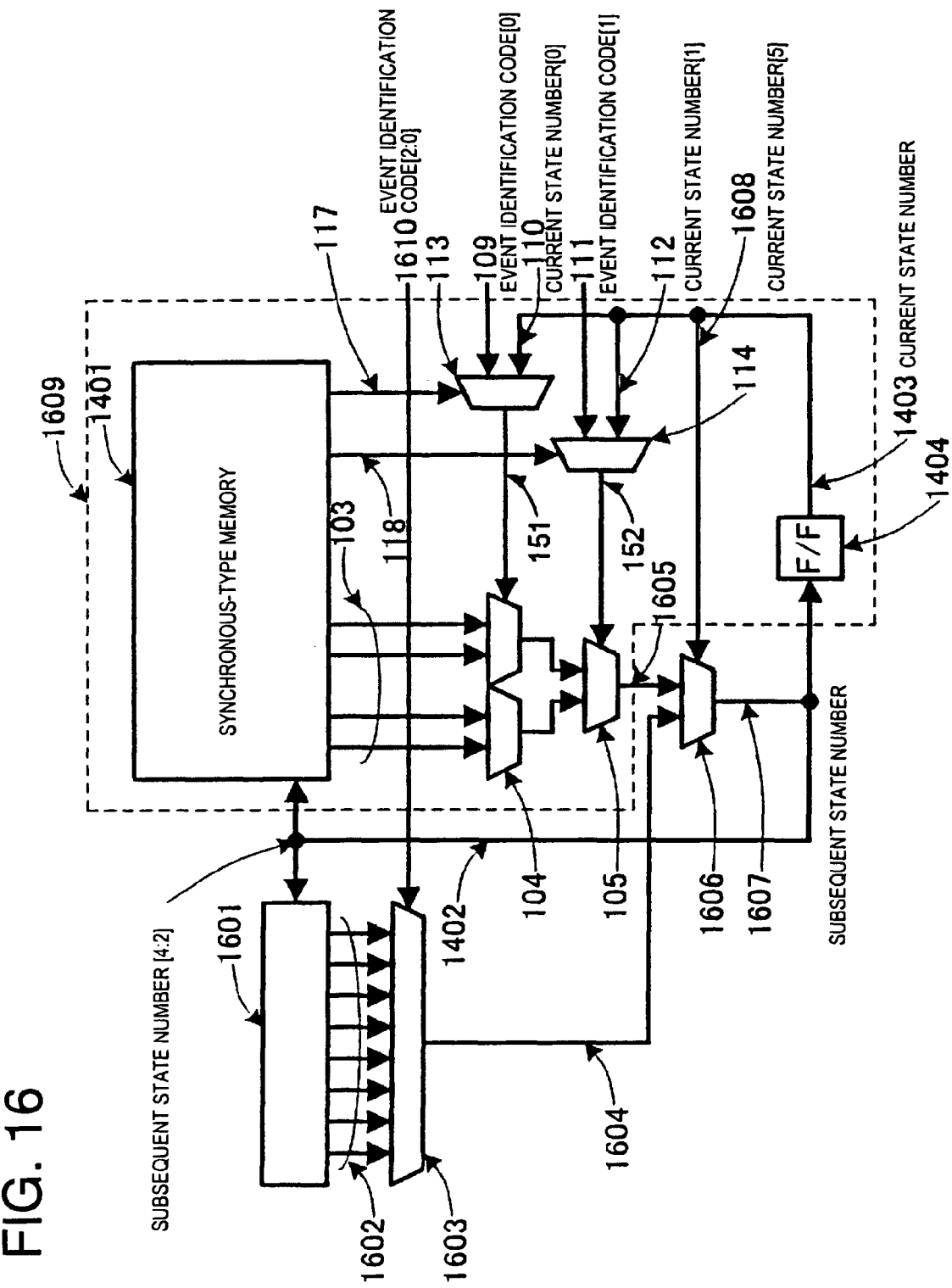
FIG. 16 is a diagram showing a third exemplary embodiment of the present invention.
Figure 19:
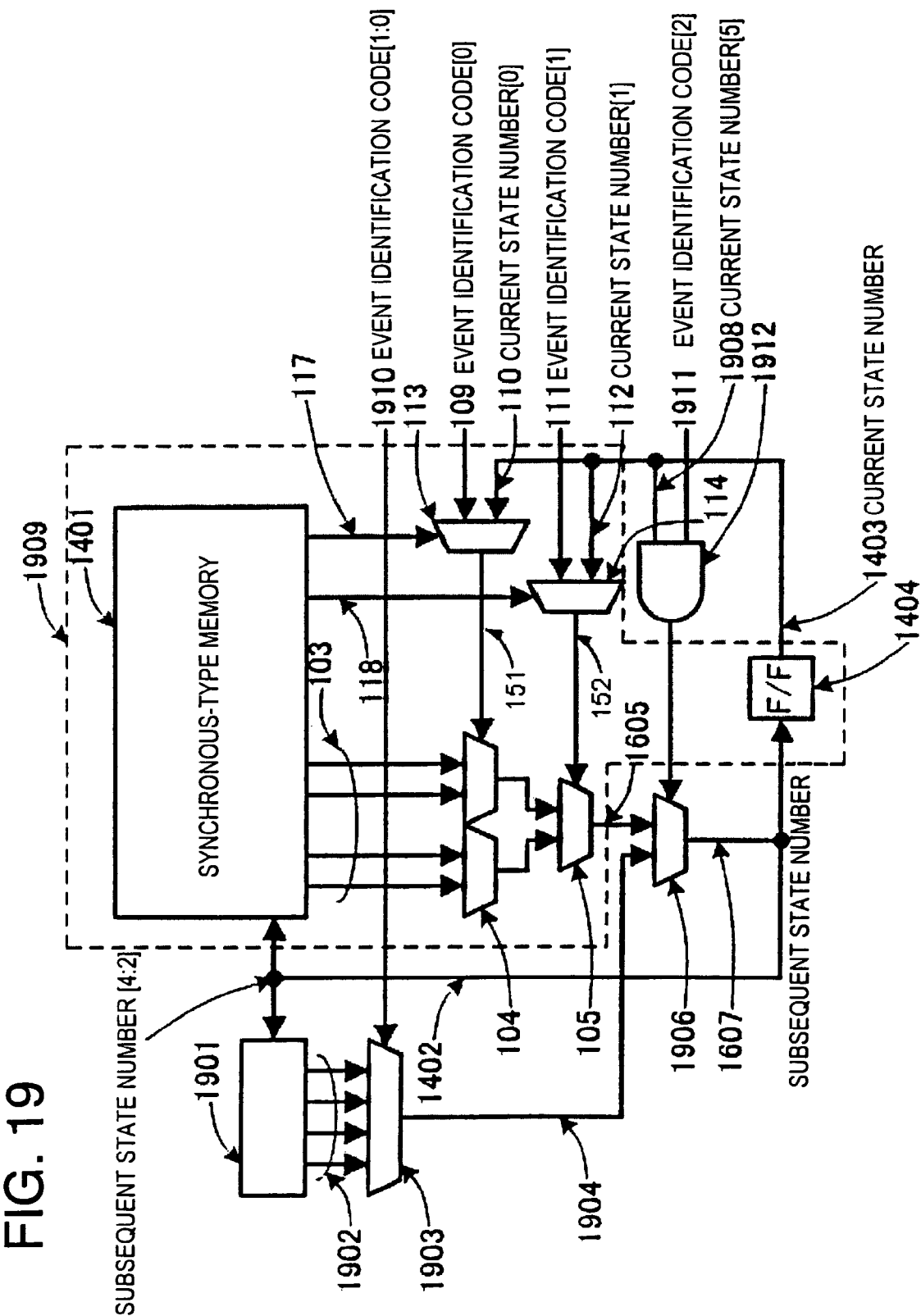
FIG. 19 is a block diagram showing a fourth exemplary embodiment of the present invention.

Further, as shown in FIGS. 16 and 19, the state transition management device in the exemplary embodiment may further include an extended memory (1601, 1901) which stores at least a portion of the subsequent state number candidates for the state number having multiple branches and having the subsequent state number candidates of the number that exceeds the number of the subsequent state number candidates which may be read out from the memory 1401 in one time access. The selection circuit (104, 105, 113, 114, 1603, 1606, 1903, 1906, 1912) may be a selection circuit which selects the subsequent state number from the subsequent state number candidates including the subsequent state number candidates (1602, 1902) read out from the extended memory (1601, 1901).

Further, as shown in FIGS. 16 and 19, in the state transition management device in the exemplary embodiment, the selection circuit (104, 105, 113, 114, 1603, 1606, 1903, 1906, 1912) may further include an extended selector (1603, 1903) and an extended subsequent state number selector (1606, 1906). The extended selector (1603, 1903) selects one subsequent state number candidate (1604, 1904) from the subsequent state number candidates (1602, 1902) read out from the extended memory (1601, 1901) based on a part of the bits (1610, 1910) of the signal based on the event. The extended subsequent state number selector (1606, 1906) selects the subsequent state number from a subsequent state number candidate 1605 selected from the plurality of subsequent state number candidates read out from the memory 1401 and the subsequent state number candidate (1604, 1904) selected by the extended selector (1603, 1903).

Further, as shown in FIGS. 14, 15, 16, and 19, in the state transition management device in the exemplary embodiment, the selection method specifying unit 1502 may be a portion of the memory 1401, and the memory 1401 may be a memory from which the selection method specifying signal (117, 118) is read out, together with the plurality of subsequent state number candidates 103 when the memory 1401 receives the first signal 1402 as the address. In this embodiment, a second signal 1402 is identical to the first signal 1402.

Further, as shown in FIG. 1, the selection method specifying unit 115 in the state transition management device in the exemplary embodiment may be formed of a logic circuit.

Further, as shown in FIGS. 1, 14, 16, and 19, a state transition management method in an exemplary embodiment of the present invention is a state transition management method of a state transition management device which uses a memory (101, 1401) from which a plurality of subsequent state number candidates 103 that may be a subsequent state number are read out when an address (102, 1402) based on a current state number is given and selects the subsequent state number 106 from among the plurality of subsequent state number candidates 103 based on an event (109, 111) supplied from an outside when the plurality of the subsequent state number candidates are present for the state number. The method is performed as follows. In case where the address for the state number having the subsequent state number candidates that are small in number is given, a plurality of subsequent state number candidates for a plurality of state numbers are read out from the memory (101, 1401). The subsequent state number candidates 103 for the plurality of sate numbers are narrowed down to subsequent state number candidates for the current state number, based on at least a part of bits (110, 112) of the state number. And the subsequent state number is selected from among the subsequent state number candidates for the current subsequent state number based on the event (109, 111).

Each exemplary embodiment of the present invention will be described below, with reference to drawings.

[First Exemplary Embodiment]

FIG. 1 is a block diagram showing an overall configuration of a state transition management device according to a first exemplary embodiment of the present invention. Reference numeral 101 indicates a memory that stores a state transition rule, and reference numeral 102 indicates a first signal based on a state number, which indicates a part of bits that constitute a current state number 108. Reference numeral 103 indicates subsequent state number candidates output from the memory 101. Herein, It is assumed each of the current state number 108, a subsequent state number 106, and each of the subsequent state number candidates included in the subsequent state number candidates 103 has a value indicated by 5 bits. It is assumed that the first signal 102 indicates high-order 3 bits of the current state number 108. It is assumed that the memory 101 needs a 3-bit width which is the same as that of the signal 102 for an address input and a bit width which is the same as that of the subsequent state number candidates 103 for a data output, and is the memory of an asynchronous operation where data is output when an address is input.

Selectors 104, 105, 113, and 114 function as a selection circuit as a whole which selects one subsequent state number 106 from the subsequent state number candidates 103. Parts of bits 109 and 111 of an event identification code, parts of bits 110 and 112 of the current state number 108 (third signal based on the state number), and selection method specifying signals 117 and 118 are supplied to selection signal selectors 113 and 114, respectively.

The bits 109, 111 of the event identification code is supplied from outside the state transition management device. The bits 109, 111 of the event identification code is a signal for selecting one of a plurality of transition destinations as a subsequent state when one state has the plurality of transition destinations in a state transition diagram. When the transition destination of a state differs according to whether a variable A in a data path is positive or negative, the value of the event identification code is made to differ according to whether the value of the variable A is positive or negative.

Low-order 2 bits of the current state number 108 are respectively used for the bits 110 and 112. The selection signal selector 113 outputs the part of bits 109 of the event identification code or the part of bits 110 of the current state number 108 as a selection signal 151 for the subsequent state number selector 104, based on the selection method specifying signal 117. The selection signal selector 114 outputs the part of bits 111 of the event identification code or the part of bits 112 of the current state number 108 as a selection signal 152 for the subsequent state number selector 105, based on the selection method specifying signal 118.

The subsequent state number selectors 104 and 105 select one subsequent state number 106 from the subsequent state number candidates 103, based on the selection signals 151 and 152. This subsequent state number 106 is output outside from the state transition management device, and is used for switching a data path operation, or the like. Incidentally, though the subsequent state number 106 is output outside from the state transition management device in FIG. 1, the current state number 108 may be output.

Reference numeral 107 indicates a register that converts the subsequent state number 106 to the current state number 108, reference numeral 108 indicates the current state number output from the register 107. The register 107 outputs the subsequent state number that has been received as the input 106 in the form of the output 108 in a subsequent clock cycle. It is convenient that the output 108 be initialized by a reset signal.

The selection method specifying unit 115 receives a second signal 116 based on the state number, and outputs the selection method specifying signals 117 and 118. The selection method specifying unit 115 determines which one of the bits 109 and 111 of the event identification code and the low-order 2 bits 110 and 112 of the current state number (third signal based on the state signal) are selected at each of the selection signal selectors 113 and 114, and outputs its selection as the selection method specifying signals 117 and 118. The second signal 116 based on the state number is a portion of the current state number 108. The high-order 3 bits of the current state number 108 are herein assigned to the second signal 116.

Figure 2:
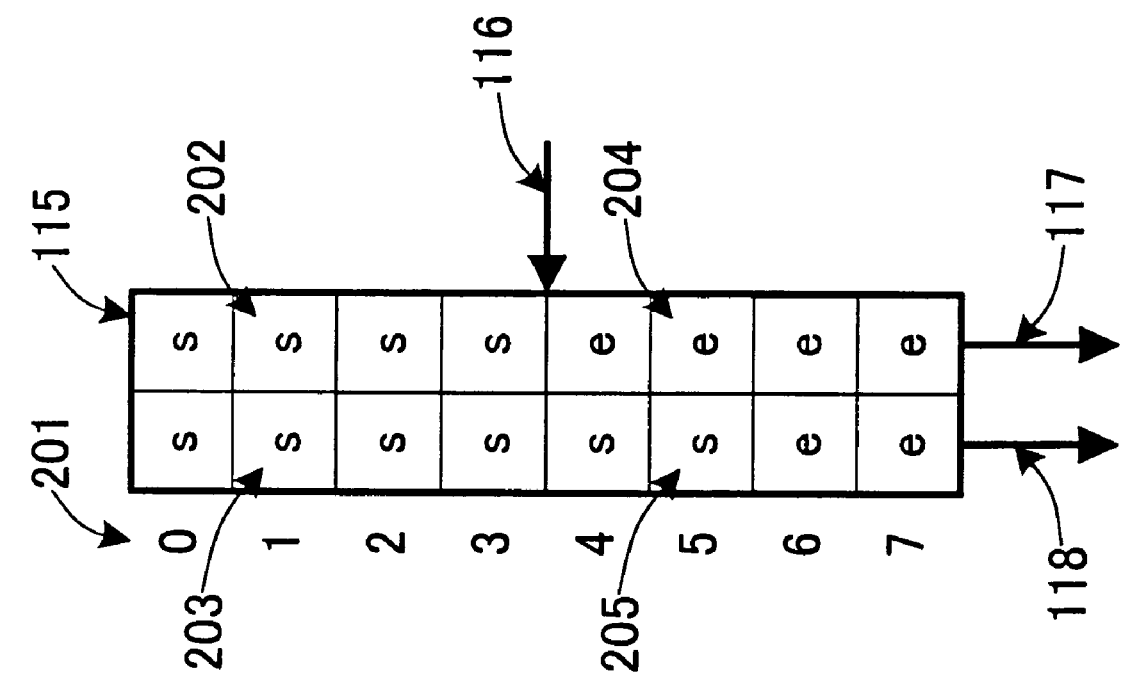
FIG. 2 is a diagram showing an internal configuration of a selection method specifying unit 115 in the first exemplary embodiment of the present invention.

FIG. 2 is a diagram showing an internal configuration of the selection method specifying unit 115. Reference numeral 201 indicates a value corresponding to the second signal (input of the high-order 3 bits of the current state number) 116 based on the state number, and indicates which row value in a block 115 is output as the selection method specifying signals 117 and 118 according to the value 116 of an input of 3-bit width or one of 0 to 7. When a value 1 is supplied in the form of the second signal 116, for example, a value s in a block 202 is output as the signal 117, and the value s in a block 203 is output as the signal 118. When a value 5 is supplied in the form of the second signal 116, the value s in a block 204 is output as the signal 117, and a value e in a block 205 is output as the signal 118. The value s shown in the block 202 or the like indicates selection of the low-order 2 bits 110 and 112 of the current state number when supplied to the selectors 113 and 114 through the signals 117 and 118. The value e shown in the block 205 or the like indicates selection of the bits 109 and 111 of the event identification code when supplied to the selectors 113 and 114 through the signals 117 and 118.

Figure 3A:
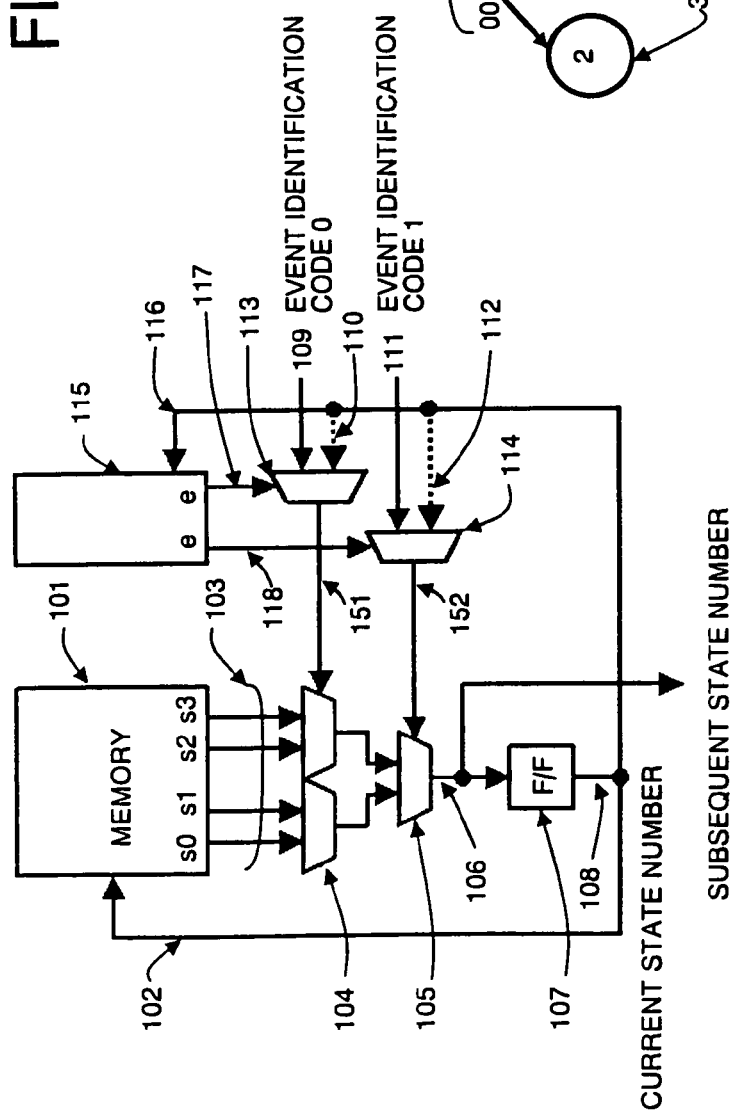
FIGS. 3A and 3B are diagrams explaining a 4-branching operation in the first exemplary embodiment of the present invention.
Figure 3B:
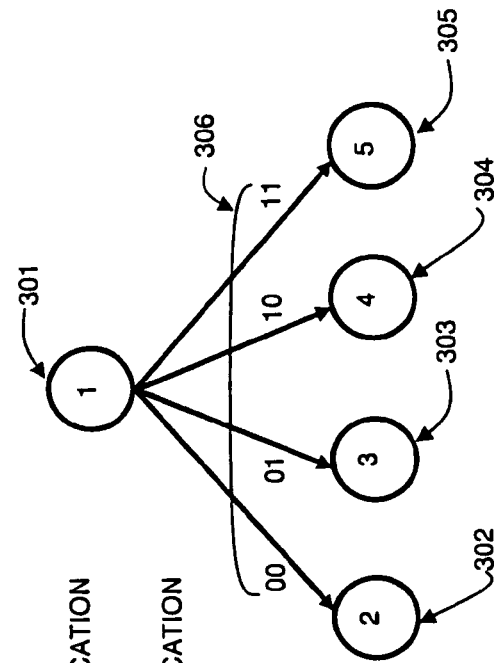

Next, an operation of the state transition management device of the present invention will be described using FIGS. 3 and 5. First, a 4-way branching operation will be described. Referring to FIG. 3A, the values e are output as the selection method specifying signals 117 and 118 from the selection method specifying unit 115, according to the value of the second signal (high-order 3 bits of the current state number) 116 based on the state number. For that reason, the bits 109 and 111 of the event identification code are selected at the selection signal selectors 113 and 114, respectively. Then, the subsequent state number selectors 104 and 105 select one subsequent state number 106 from among the subsequent state number candidates 103, based on the value of the bits 109, 111 of the event identification code. This operation means selection of one of the four subsequent state number candidates 103 output from the memory 101 when the high-order 3 bits 102 of the current state number (first signal based on the state number) are supplied to the memory 101, according to the two bits 109 and 111 of the event identification code. That is, as shown in FIG. 3B, there are four possible states 302, 303, 304 and 305 that are subsequent to a current state 301, and 4-way branching, which is selection of one state according to the value of an event identification code 306 of 2 bits, is implemented. When the value of the event identification code 306 is "b00", a transition from a state 1 to a state 2 is made. When the value of the event identification code 306 is "b01", transition from the state 1 to a state 3 is made. When the value of the event identification code 306 is "b10", transition from the state 1 to a state 4 is made. When the value of the event identification code 306 is "b11", transition from the state 1 to a state 5 is made.

Figure 4A:
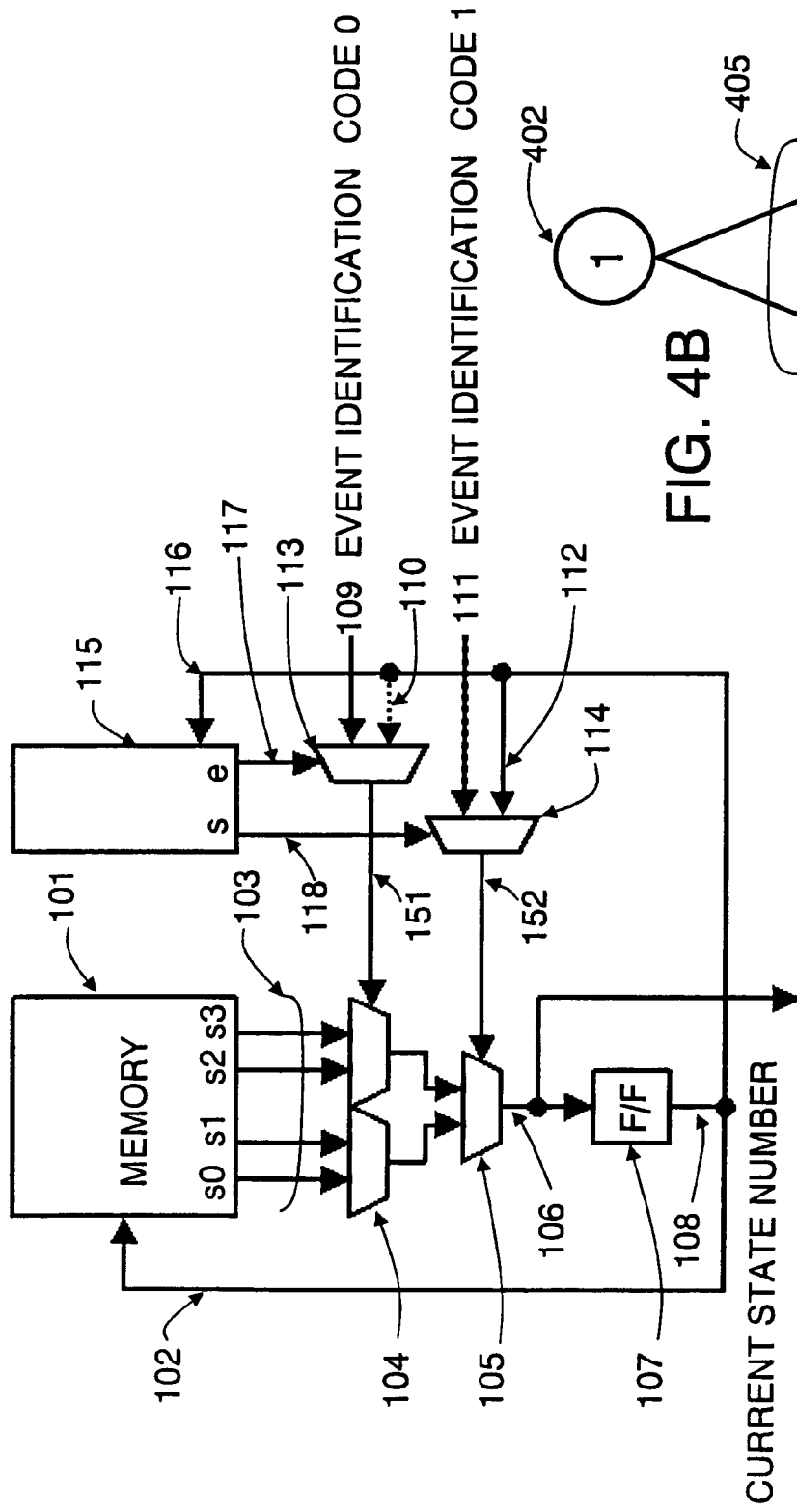
FIGS. 4A and 4B are diagrams explaining a 2-way branching operation in the first exemplary embodiment of the present invention.
Figure 4B:
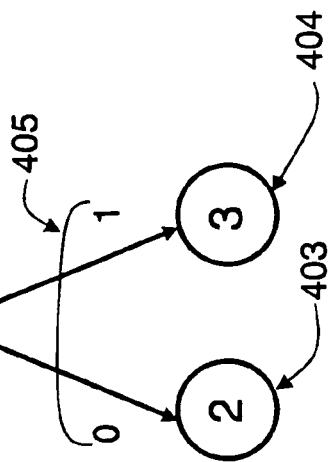

Next, a 2-way branching operation will be described, using FIG. 4. Referring to FIG. 4A, the value e is output as the selection method specifying signal 117 and the value s is output as the selection method specifying signal 118 from the selection method specifying unit 115, according to the high-order 3 bits 116 of the current state number. Thus, the part of bits 109 of the event identification code is selected at the selection signal selector 113, and the value of the second highest bit 112 of the low-order 2 bits of the current state number is selected at the selection signal selector 114. Then, the subsequent state number selector 104 and the subsequent state number selector 105 select one of the subsequent state number candidates 103, respectively based on the value of the part of bits 109 of the event identification code and the value of the second highest bit 112 of the low-order 2 bits of the current state number. Values s0 and s1 or values s2 and s3 are selected at the subsequent state number selector 104 from among the four values s0, s1, s2, and s3 output from the memory 101, according to the value 109 of the event identification code. Further, one of the values s0 and s1 or one of the values s2 and s3 is selected at the subsequent state number selector 105 according to the second highest bit 112 of the low-order 2 bits of the current state number. This operation means selection of two of the four subsequent state number candidates 103 by a combination of the memory 101 and the selector 105, according to the high-order 3 bits of the current state number and the second lowest bit 112 of the low-order 2 bits of the current state number, and one of the selected subsequent state number candidates is selected by the selector 104 according to the value 109 of the event identification code. Accordingly, as shown in FIG. 4B, there are two possible states 403 and 404 that are subsequent to a current state 402, and 2-way branching, which is selection of one state according to the value of an event identification code 405 of 1 bit, is implemented. When the value of the event identification code 405 is "0", transition from the state 1 to the state 2 is made. When the value of the event identification code 405 is "1", transition from the state 1 to the state 3 is made.

Finally, a no branching operation will be described using FIG. 5. Referring to FIG. 5A, the values s are output as the selection method specifying signals 117 and 118 from the selection method specifying unit 115, according to the second signal (high-order 3 bits of the current state number) 116 based on the state number. For that reason, the third signal based on the state number (of low-order 2 bits of the current state number) 110 and 112 are selected at the selection signal selectors 113 and 114, respectively. Then, the subsequent state number selectors 105 and 104 select one subsequent state number 106 from among the subsequent state number candidates 103, according to the value of the third signal based on the state number (of low-order 2 bits of the current state number) 112, 110. This operation means determination of one subsequent state number at a block 501 where the memory 101 and the selectors 104 and 105 are combined, according to the first signal 102 based on the state number (high-order 3 bits of the current state number) and the third signal (low-order 2 bits of the current state number) 112 and 110, or all the bits of the current state number. Accordingly, as shown in FIG. 5B, a state subsequent to a current state 502 is determined to be a state 503, thereby implementing no branching (one-way branching) where a transition destination is determined without depending on the value of the event identification code. In the case of this example, a state subsequent to the state 1 is always the state 2.

A relationship between the current state number and the number of possible branches is determined by the configuration of the selection method specifying unit 115. This operation will be described, using FIG. 2. Referring to FIG. 2, values are output to the signals 117 and 118 in response to input of the signal 116 (second signal based on the state number), which indicates the high-order 3 bits of the current state number. When the input value of the signal 116 is one of 0 to 3, the values s are output as the selection method specifying signals 117 and 118. Thus, no branching shown in FIG. 5 is implemented. When the input value of the signal 116 is 4 or 5, the value e and the value s are output as the selection method specifying signals 117 and 118. Thus, 2-way branching shown in FIG. 4 is implemented. When the input value of the signal 116 is 6 or 7, the values e are output as the selection method specifying signals 117 and 118. Thus, 4-way branching as shown in FIG. 3, is implemented.

Next, a method of holding the state transition rule in the memory 101 will be described. A storage method in the memory 101 depends on the content of the selection method specifying unit 115. Thus, a description will be given about the method of holding the state transition rule, in combination with the storage method in the selection method specifying unit 115.

Figure 6B:
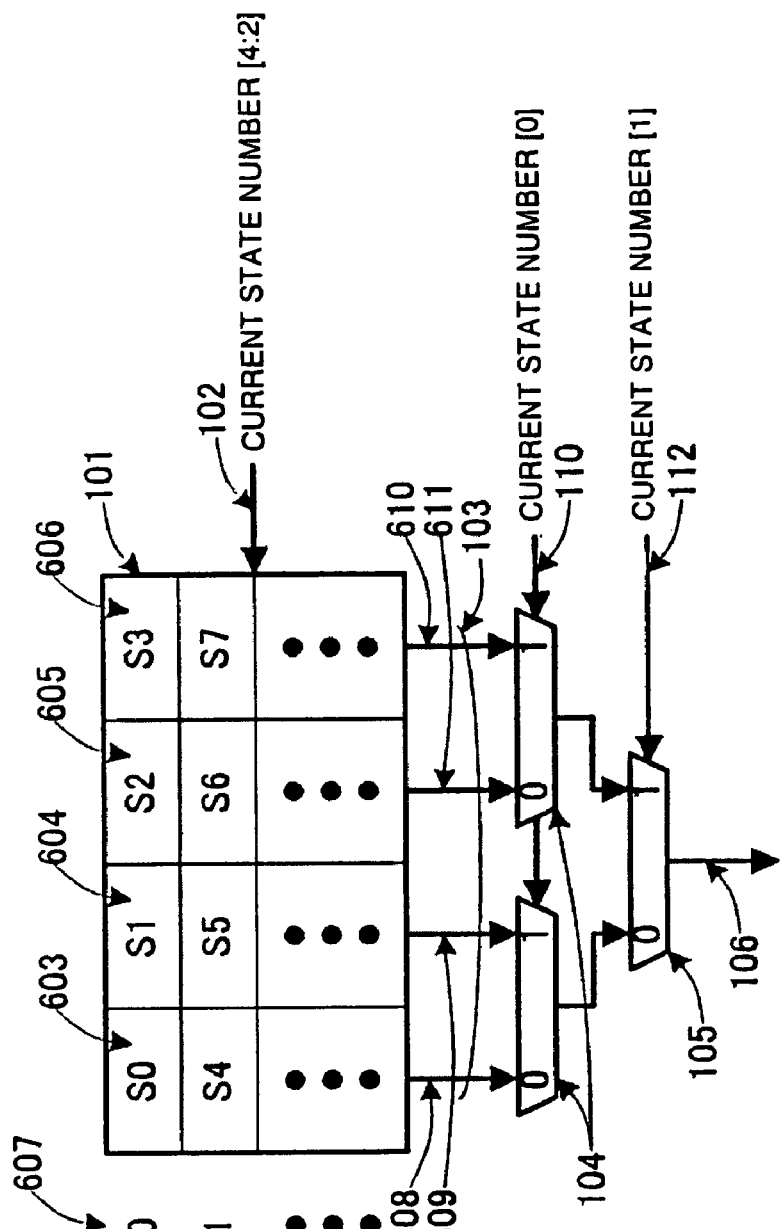
FIGS. 6A and 6B are diagrams explaining operations of a memory 101 and the selection method specifying unit 115 at a time of the 4-way branching operation in the first exemplary embodiment of the present invention.
Figure 6A:
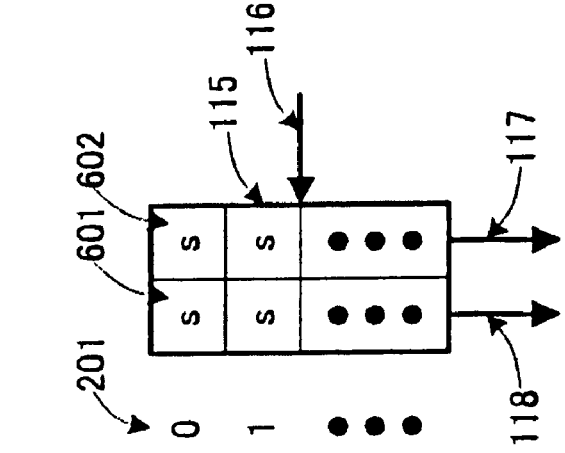

First, the method of holding the state transition rule when state transition is made with no branching will be shown in FIG. 6. Since the transition is made to a state without branching, the selection method specifying unit 115 outputs the values s as the selection method specifying signals 117 and 118, according to the value of the high-order 3 bits 116 of the current state number (second signal based on the state number). In this case, the state transition rule having a configuration as shown in FIG. 6B is held inside the memory 101. Herein, reference numeral 607 is shown for explaining a value corresponding to the input value of the high-order 3 bits 102 of the current state number (first signal based on the state number), which means that four values in a row of a column 607 in the memory 101 for a value that matches the input value of the high-order 3 bits 102 are output as the subsequent state number candidates 103. Reference character S0 shown in a column 603 indicates the holding region of a state number subsequent to the state 0 in the memory 101. Likewise, reference character S1 shown in a column 604 indicates the holding region of a state number subsequent to the state 1, reference character S2 shown in a column 605 indicates the holding region of a state number subsequent to the state 2, and reference character S3 shown in a column 606 indicates the holding region of a state number subsequent to the state 3. With this arrangement, when a value 0 is supplied to the high-order 3 bits 102 of the current state number (first signal based on the state number), for example, values S0, S1, S2, and S3 which are four values in the row corresponding to 0 in the column 607 and held in the respective regions of the columns 603, 604, 605, and 606 are output as the subsequent state number candidates 103. Accordingly, in the case of the state transition without branching, state numbers (S0, S1, S2, and S3 in the example) subsequent to different four current state numbers (which are 0, 1, 2, and 3 in the example) should be held in the same row in the memory 101. In a combination of the four state numbers, the four state numbers have same high-order 3 bits. This is because subsequent state number candidates concurrently output as the subsequent state number candidates 103 are determined by the high-order 3 bits of the current state number 102 (first signal based on the state number).

The subsequent state numbers included in a same row in the memory 101 are arranged from the left in the descending order of the current state numbers. This arrangement is determined by the configurations of the selectors 104 and 105 and connection of the low-order 2 bits 110, 112 of the current state number (third signal based on the state number) to be used at the selectors 104 and 105. In the configuration in FIG. 6B, when the low-order 2 bits 112 and 110 of the current state number are b00, an output 608 is selected as the subsequent state number 106. When the low-order 2 bits 112 and 110 of the current state number are b01, an output 609 is selected as the subsequent state number 106. When the low-order 2 bits 112 and 110 of the current state number are b10, an output 610 is selected as the subsequent state number 106. When the low-order 2 bits 112 and 110 of the current state number are b11, an output 611 is selected as the subsequent state number 106. Thus, the subsequent state number candidate S0 in the column 603, the subsequent state number candidate S1 in the column 604, the subsequent state number candidate S2 in the column 605, and the subsequent state number candidate S3 in the column 606 are arranged in this stated order. Referring to FIG. 6B as a whole, when 5 bits obtained by combining the high-order 3 bits (bit 4:2) 102 of the current state number (first signal based on the state number) and the low-order 2 bits (bit 1 and bit 0) 112, 110 (third signal based on the state number), or when the current state number 108 is 0, the value S0 is selected as the subsequent state number. When the current state number 108 is 1, the value S1 is selected as the subsequent state number. When the current state number 108 is 2, the value S2 is selected as the subsequent state number. When the current state number 108 is 3, the value S3 is selected as the subsequent state number.

Figure 7B:
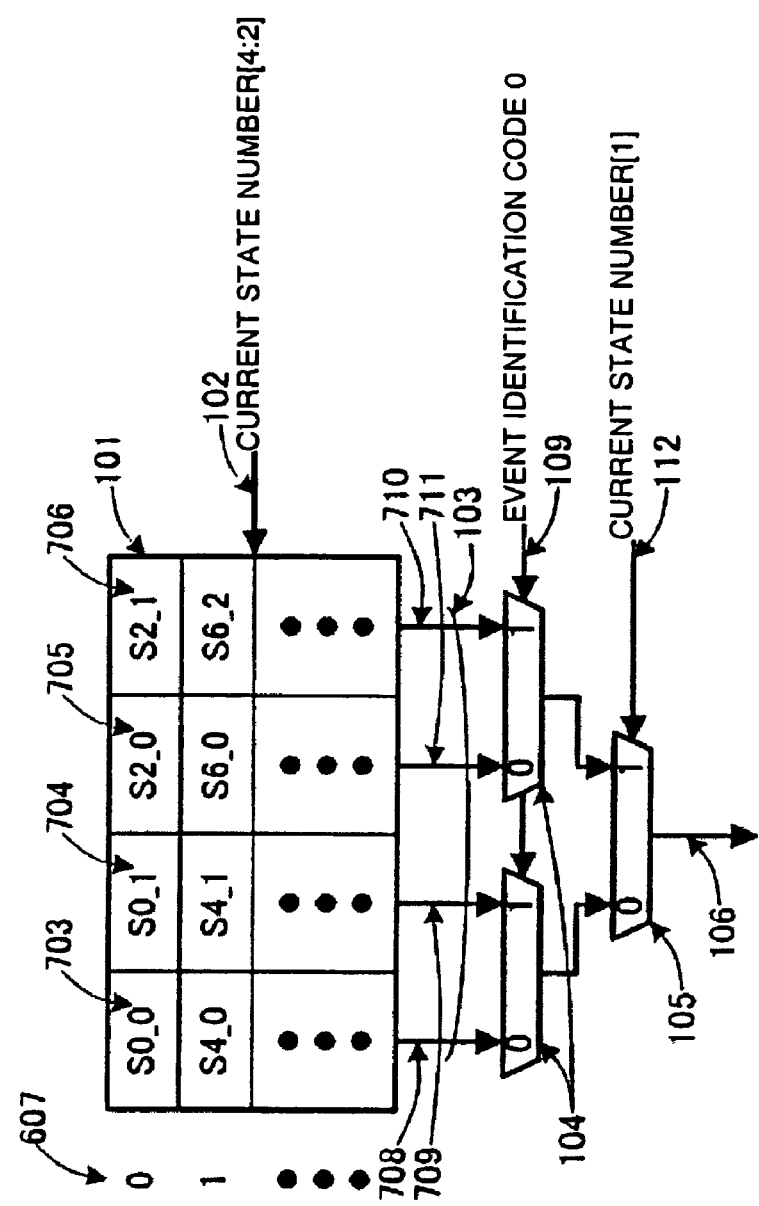
FIGS. 7A and 7B are diagrams explaining operations of the memory 101 and the selection method specifying unit 115 at a time of the 2-way branching operation in the first exemplary embodiment of the present invention.
Figure 7A:
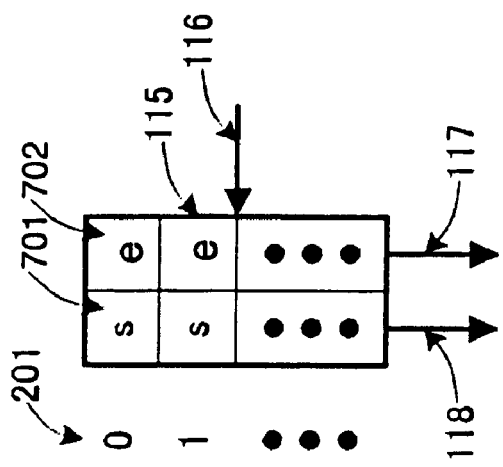

Next, a method of holding the state transition rule when 2-way branching is implemented will be shown in FIG. 7. When state transition is made with 2-way branching, the values e and s are output as the selection method specifying signals 117 and 118, respectively, as shown in FIG. 4. In this case, the state transition rule having a configuration as shown in FIG. 7B is held inside the memory 101. Reference character S0_0 shown in a column 703 and reference character S0_1 shown in a column 704 indicate holding regions of two state numbers subsequent to the state 0 in the memory 101, and indicate that a value in the region S0_0 in the column 703 is the subsequent state number when the event identification code is 0 and a value in the region S0_1 in the column 704 is the subsequent state number when the event identification code is 1. Likewise, reference character S2_0 shown in a column 705 and reference character S2_1 shown in a column 706 indicate holding regions of state numbers subsequent to the state 2 in the memory 101, and indicate that a value in the region S2_0 in the column 705 is the subsequent state number when the event identification code is 0 and a value in the region S2_1 in the column 706 is the subsequent state number when the event identification code is 1. With this arrangement, when the value 0 is supplied to the high-order 3 bits 102 of the current state number (first signal based on the state number), values S0_0, S0_1, S2_0, and S2_1 which are four values in the row corresponding to 0 in the column 607 and held in the respective regions of the columns 703, 704, 705, and 706 are output as the subsequent state number candidates 103. As described above, in the case of the state transition with 2-way branching, two state number candidates (S0_0 and S0_1, and S2_0 and S2_1 in the example) subsequent to different two current state numbers (which are 0 and 2 in the example) should be held in a same row in the memory 101. In a combination of the two state numbers, the two state numbers have same high-order 3 bits. This is because subsequent state number candidates concurrently output as the subsequent state number candidates 103 are determined by the high-order 3 bits 102 of the current state number (first signal based on the state number).

Combinations of the subsequent state numbers included in a same row in the memory 101 are arranged from the left in the descending order of the current state numbers (as shown in the columns 703 and 704, and the columns 705 and 706). In each combination, the subsequent state number when the event identification code is 0 (as shown in the column 703) is arranged on the left and the subsequent state number when the event identification code is 1 (as shown in the column 704) is arranged on the right. This arrangement is determined by the configurations of the selectors 104 and 105 and connection of the second highest bit 112 of the low-order 2 bits of the current state number and the parts of bits 109 of the event identification code to be used at the selectors 104 and 105. In the example in FIG. 7B, when the event identification code is 0, outputs 708 and 710 are selected. When the even identification code is 1, outputs 709 and 711 are selected. When the value of the second highest bit 112 of the low-order 2 bits of the current state number is 0, the output 708 or 709 is selected. When the value of the second highest bit 112 of the low-order 2 bits of the current state number is 1, the output 710 or 711 is selected. For that reason, two subsequent state number candidates from a certain state are arranged. One of the two subsequent state number candidates when the event identification code is 0 is arranged on the left, while the other of the two subsequent state number candidates when the event identification code is 1 is arranged on the right. In the combination of the two subsequent state number candidates, the subsequent state number candidate for the current state number with a smaller value is stored on the left.

Finally, a method of holding the state transition rule when state transition is implemented with 4-way branching will be shown in FIG. 8. When the state transition is made with 4-way branching, the values e are output as the selection method specifying signals 117 and 118, as shown in FIG. 3. In this case, the state transition rule having a configuration as shown in FIG. 8B is held inside the memory 101. Reference character S0_0 shown in a column 803, reference character S0_1 shown in a column 804, reference character S0_2 shown in a column 805, and reference character S0_3 shown in a column 806 all indicate holding regions of 4 subsequent state number candidates subsequent to the state 0 in the memory 101, and indicate that a value in the region S0_0 in the column 803 is the subsequent state number when the 2 bits 111 and 110 of the event identification code indicate b00, a value in the region S0_1 in the column 804 is the subsequent state number when the 2 bits 111 and 110 of the event identification code indicate b01, a value in the region S0_2 in the column 805 is the subsequent state number when the 2 bits 111 and 110 of the event identification code indicate b10, and a value in the region S0_3 in the column 806 is the subsequent state number when the 2 bits 111 and 110 of the event identification code indicate b11. With this arrangement, when the value 0 is supplied to the high-order 3 bits 102 of the current state number, values S0_0, S0_1, S0_2, and S0_3 which are four values in the row corresponding to 0 in the column 607 and held in the respective regions of the columns 803, 804, 805, and 806 are output as the subsequent state number candidates 103. As described above, in the case of a state with 4-way branching, four subsequent state number candidates for one current state number should be held in a same row in the memory 101.

The subsequent state number candidates included in the same row in the memory 101 are arranged from the left in the descending order of the values of the 2 bits 111 and 109 of the event identification code. This arrangement is determined by the configurations of the selectors 104 and 105 and connection of the bits 111 and 109 of the event identification code to be used at the selectors 104 and 105. In the example in FIG. 8B, when the bits of 111 and 109 of the event identification code indicate b00, an output 808 is selected as the subsequent state number 106. When the bits 111 and 109 of the event identification code indicate b01, an output 809 is selected as the subsequent state number 106. When the bits 111 and 109 of the event identification codes indicate b10, an output 810 is selected as the subsequent state number 106. When the bits 111 and 109 of the event identification code indicate b11, an output 811 is selected as the subsequent state number 106. Thus, the subsequent state number candidate S0_0 in the column 803, the subsequent state number candidate S0_1 in the column 804, the subsequent state number candidate S0_2 in the column 805, and the subsequent state number candidate S0_3 in the column 806 are arranged in this stated order.

The above description was given about the method of holding the state transition rule in the memory 101 in each of the cases where state transition is made without branching, where state transition is made with 2-way branching, and where state transition is made with 4-way branching. An example where these methods are combined is shown in FIG. 9. First, a configuration of the selection method specifying unit 115 is shown in FIG. 9A. When the input value of the high-order 3 bits of the current state number (second signal based on the state number) 116 is each of the values 0 to 3, state transition is made without branching (1-way branching). Then, as shown in a block 901, the values s are output as both of the selection method specifying signals 117 and 118. When the input value of the high-order 3 bits of the current state number 116 is 4 or 5, state transition is made with 2-way branching. Then, as shown in a block 902, the value e and the value s are respectively output as the selection method specifying signals 117 and 118. When the input value of the high-order 3 bits of the current state number 116 is 6 or 7, state transition is made with 4-way branching. Then, as shown in a block 903, the values e are output as both of the selection method specifying signals 117 and 118. Next, with respect to the method of holding the state transition rule in the memory 101, in the range of a block 904 corresponding to the block 901 of the selection method specifying unit 15 where state transition is made without branching, each region corresponds to one of the current state numbers 0 to 15, as shown in FIG. 6B. On the other hand, in the region of a block 905 corresponding to the block 902 of the selection method specifying unit 115 where state transition is made with 2-way branching, every two regions correspond to one of the current state numbers 16, 18, 20, and 22. The range of a block 906 corresponding to the block 903 of the selection method specifying unit 116 where state transition is made with 4-way branching, every four regions correspond to one of the current state numbers 24 and 28.

A summary of the above description is as shown in FIG. 9C. State transition where the number of branches is 1 can be made for 16 current state numbers of 0 to 15. State transition where the number of branches is 2 can be made for 4 current state numbers of 16, 18, 20, 22. State transition where the number of branches is 4 can be made for 2 current state numbers of 24 and 28. In a conventional configuration, only eight states can be loaded using 4-way branching in the memory shown in FIG. 9B. The configurations in FIGS. 9A to 9D are one example. Configurations as shown in FIGS. 10A to 10C, for example, can also be made. In this case, state transition where the number of branches is 1 can be made for 8 current state numbers of 0 to 7, as shown in a region 1004. State transition where the number of branches is 2 can be made for 6 current state numbers of 8, 10, 12, 14, 16, 18, as shown in a region 1005. State transition where the number of branches is 4 can be made for 3 current state numbers of 20, 24, and 28.

As described above, the number of branches that can be implemented and the number of states that can be implemented can be determined by the configuration of the selection method specifying unit 115. When an LSI is designed, the configuration of the selection method specifying unit 115 can be determined in advance, and can be implemented using logic circuits. Alternatively, the selection method specifying unit 115 is configured by a memory. Then, after the LSI has been manufactured, the numbers of branches and states that can be implemented can be determined by a program as well. In the case of the former method of a fixed type, a value obtained by an and logical operation on the high-order 2 bits of the second signal 116 is just used as the value of the selection method specifying signal 117, and the higher-order 1 bit of the second signal 116 is just used as the selection method specifying signal 118, as shown in FIG. 9D. Though specifications are fixed, a very simple configuration is obtained. On the other hand, in the case of the latter programmable method, the selection method specifying unit 115 can be implemented by the memory having a 3-bit width address input and a 2-bit width output. The latter method can obtain a characteristic that the number of branches and the number of states to be implemented can be flexibly set by a write into this memory.

Figure 11A:
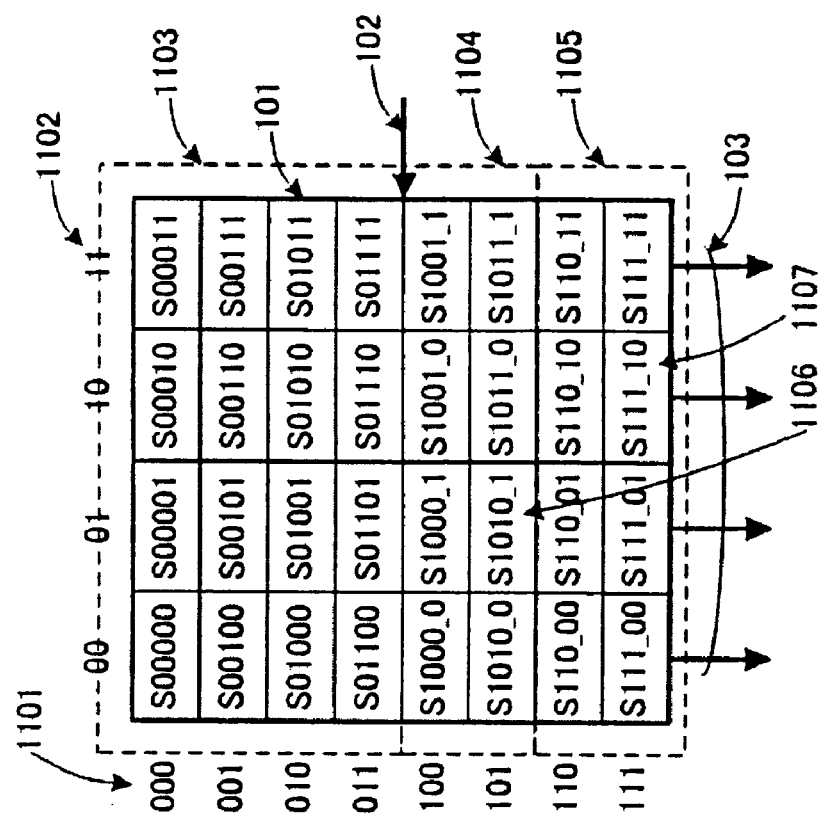
FIGS. 11A and 11B are diagrams explaining a concept of mixing 1-way branching, 2-way branching, and 4-way branching in the memory 101 in the first exemplary embodiment of the present invention.
Figure 11B:
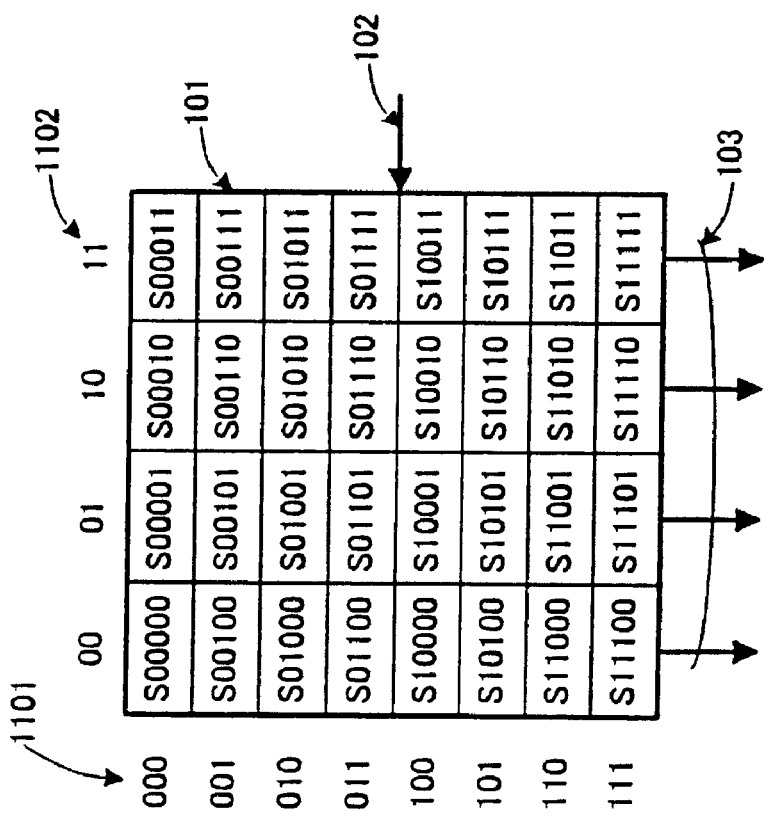

Another view of the internal configuration of the memory 101 will be shown. Numerals shown in FIG. 11A are all represented by binary numbers. Values corresponding to the high-order 3 bits 102 of the current state numbers are shown in a column 1101, and values corresponding to the low-order 2 bits 112 and 110 of the current state numbers are shown in a block 1102. Then, the value of 5 bits obtained by combining the high-order 3 bits in the column 1101 with the low-order 2 bits in the block 1102 is written down in each region in the memory 101. Further, in FIG. 11B, an under bar is added to the midway point of each of some values in the memory 101. The values in regions of a block 1103 are not changed. In each region of a block 1104, only 1 bit on the right is separated by the under bar. In each region of a block 1105, 2 bits on the right are separated by the under bar. Then, when a value on the right side of the under bar is regarded as the event identification code, when the value on the right side of the under bar is replaced with 0, and then when the resultant 5-digit numeral is read, the same internal configuration of the memory as that in FIG. 9B is obtained. The value in a region 1106 is 1010_1, for example. Thus, a numeral 1 on the right side of the under bar is the event identification code. Then, a 5-bit numeral b10100 obtained by replacing the numeral on the right side of the under bar with 0, or 20 is the state number. The value in a region 1107 is 101_10. Thus, a numeral b10 on the right side of the under bar is the event identification code. Then, a 5-bit numeral b1100 obtained by replacing the numeral on the right side of the under bar with 0, or 28 is the state number. As described above, the values shown in FIG. 11A that remain unchanged indicates no branching. Separation of 1 bit of four values horizontally arranged in a same row provides 2 two-way branching. Separation of 2 bits of four values horizontally arranged in a same row provides one 4-way branching. Combination of different branching in one row such as 2 no branching and one 2-way branching in the one row is also possible. This arrangement is, however, not desirable because control over the selectors in a stage after output of the subsequent state number candidates 103 gets complex.

[Second Exemplary Embodiment]

Figure 14:
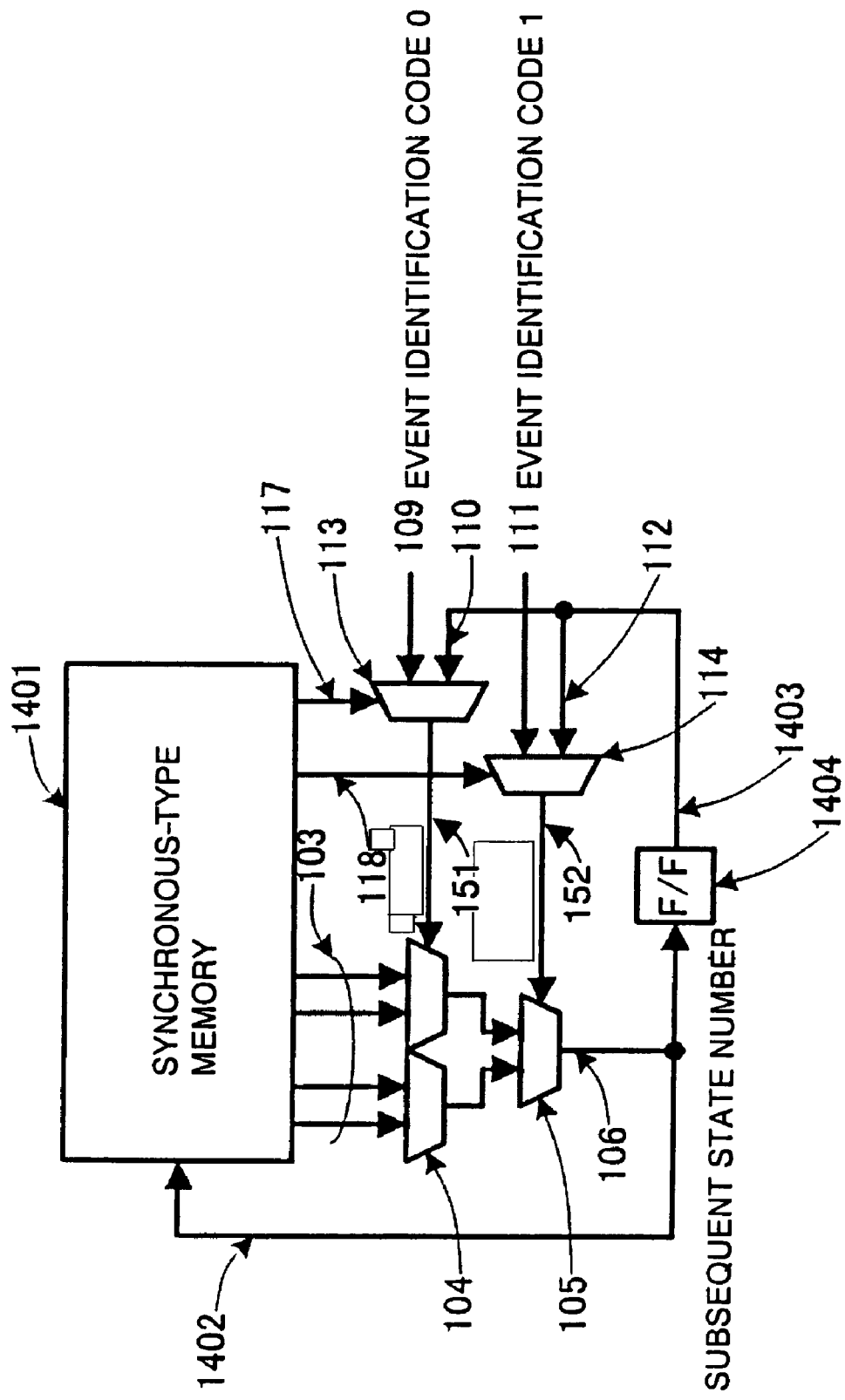
FIG. 14 is a block diagram showing a second exemplary embodiment of the present invention.

FIG. 14 is a block diagram of a state transition management device according to a second exemplary embodiment of the present invention. In FIG. 14, two improvements are made on the exemplary embodiment in FIG. 1. One of the improvements is that a memory to be used is set to a synchronous type. The other of the improvements is that the memory 101 and the selection method specifying unit 115 are brought together as one memory.

First, with respect to use of the synchronous-type memory in the former improvement, a better efficiency is obtained by using the synchronous-type memory rather than the asynchronous-type memory as shown in FIG. 1, because generally, the synchronous-type memory has become the mainstream of a high-speed memory. Then, by working out a position of a register, state transition using the synchronous memory is implemented. Referring to FIG. 1, the subsequent state number selected by the selectors 104 and 105 is passed through the register to obtain the current state number. The obtained current state number is then used at the selectors 113 and 114, memory 101, and block 115. However, in the synchronous-type memory, a register that captures and holds an address input is provided. Data is output in a cycle subsequent to address input. Then, referring to FIG. 14, a synchronous-type memory 1401 is used in FIG. 14 as a combination of the register 107 and the memory 101 in FIG. 1. Accordingly, a signal 1402 to be supplied to the synchronous-type memory 1401 indicates the high-order 3 bits of a subsequent state number, in FIG. 14. The second exemplary embodiment is not different from the first exemplary embodiment in that a subsequent state number is read out using a portion of bits of the current state number as an address input. On the other hand, as inputs to the selectors 113 and 114, the current state number is needed, as in FIG. 1. Thus, conversion from a subsequent state number 106 to a current state number 1403 is made, using a register 1404.

Figure 15:
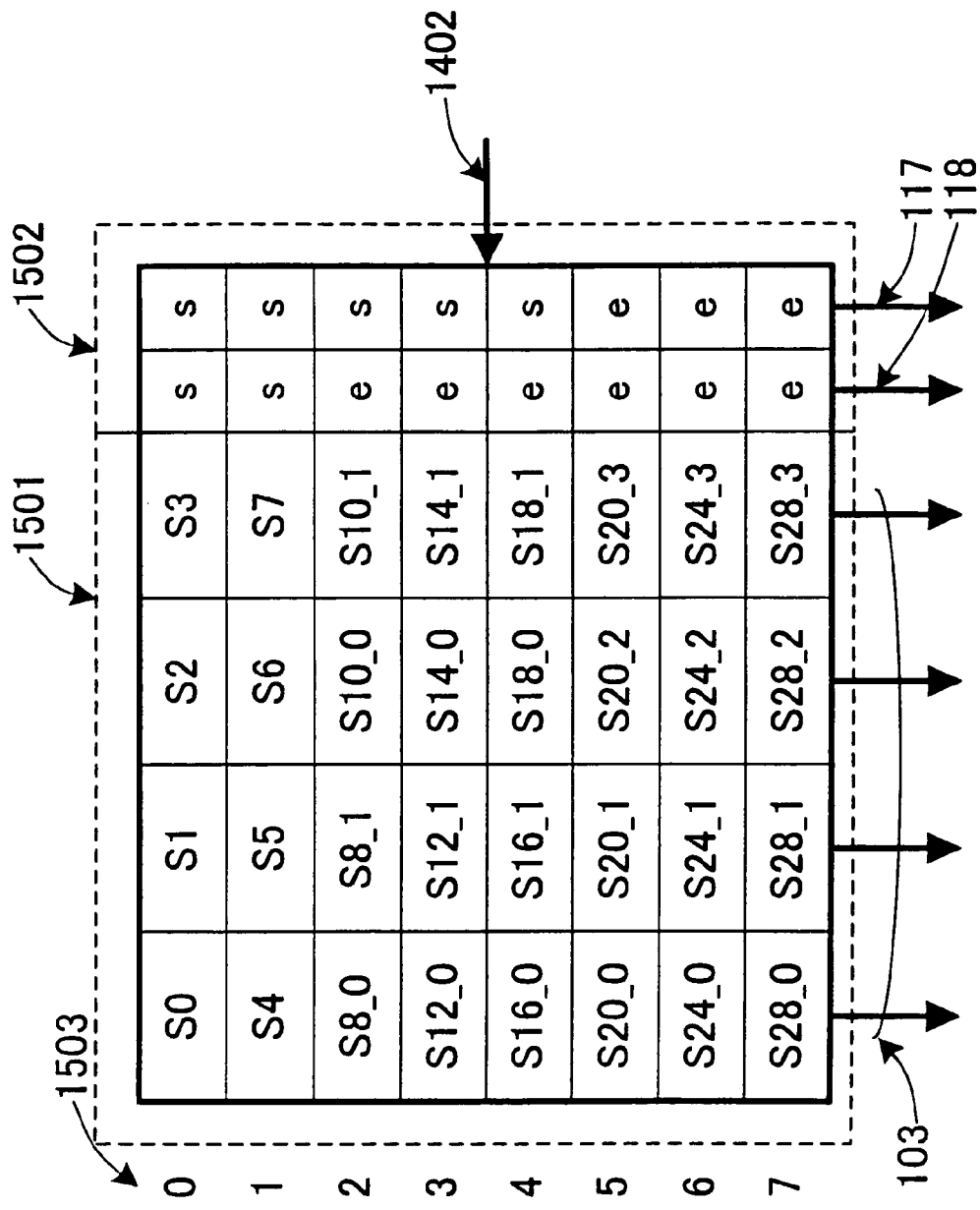
FIG. 15 is a diagram showing an internal configuration of a memory 1401 in the second exemplary embodiment of the present invention.

Next, integration of the memory 101 and the selection method specifying unit 115 in the latter improvement will be described. Referring to FIG. 1, each of the memory 101 and the selection method specifying unit 115 outputs a certain value upon reception of the high-order 3 bits of a current state number. Then, the synchronous-type memory 1401 is arranged to use the high-order 3 bits of a subsequent state number as an address input and output subsequent state number candidates 103 and values 117 and 118 for the selectors 113 and 114 as outputs. The synchronous-type memory 1401 should be configured to have an address input in common between the memory 101 and the selection method specifying unit 115 in FIG. 1, and output an addition of bit widths of outputs of the memory 101 and the selection method specifying unit 115, as shown in FIG. 15. Reference numeral 1402 indicates the high-order 3 bits of a subsequent state number, while reference numeral 1503 indicates a value showing a row to be used according to the value of the high-order 3 bits of the subsequent state number 1402. A region indicated by reference numeral 1501 is a region corresponding to the memory 101 in FIG. 1. A region indicated by reference numeral 1502 is a region corresponding to the selection method specifying unit 115. As in FIG. 1, the memory 1401 outputs subsequent state number candidates 103 and the signals 117 and 118 for the selectors 113 and 114.

In the exemplary embodiment described above, the two improvements were combined and applied. Only one of the improvements may be applied to the exemplary embodiment in FIG. 1.

[Third Exemplary Embodiment]

FIG. 16 is a block diagram of a state transition management device according to a third exemplary embodiment of the present invention. In the exemplary embodiments in FIGS. 1 and 14, the maximum number of branches was limited to the output width of the memory that stores the state transition rule, or the number of the subsequent state number candidates 103. For that reason, for a configuration that needs an extremely great number of branches, a memory with a bit width corresponding to the extremely great number of branches is needed. Thus, it may be difficult to implement such a configuration, or the efficiency of the memory may not be good. On contrast therewith, in a configuration in FIG. 16, another memory 1601 for multiple branching is included, in addition to a synchronous-type memory 1401. The memory 1601 accommodates only a state having the great number of branches that cannot be implemented by the memory 1401. In the other cases, the memory 1401 is used. With this arrangement, the bit width of the memory 1401 does not need to be extremely increased. Operations within the framework of a block 1609 in FIG. 16 are the same as those in FIG. 14. Thus, the other portions of the state transition management device will be described. In this exemplary embodiment, a description will be given using the states in FIG. 14 to which a multiple-branch state is added. Thus, each of a current state number 1403 and a subsequent state number 1607 is constituted from 6 bits, which is obtained by adding 1 bit to the current state number 1403 and the subsequent state number 1607 in FIG. 14. Further, in order to accommodate 8 branches, the bit width of an event identification code is set to 3 bits which is 1 bit larger than that in the first and second exemplary embodiments.

Figure 17:
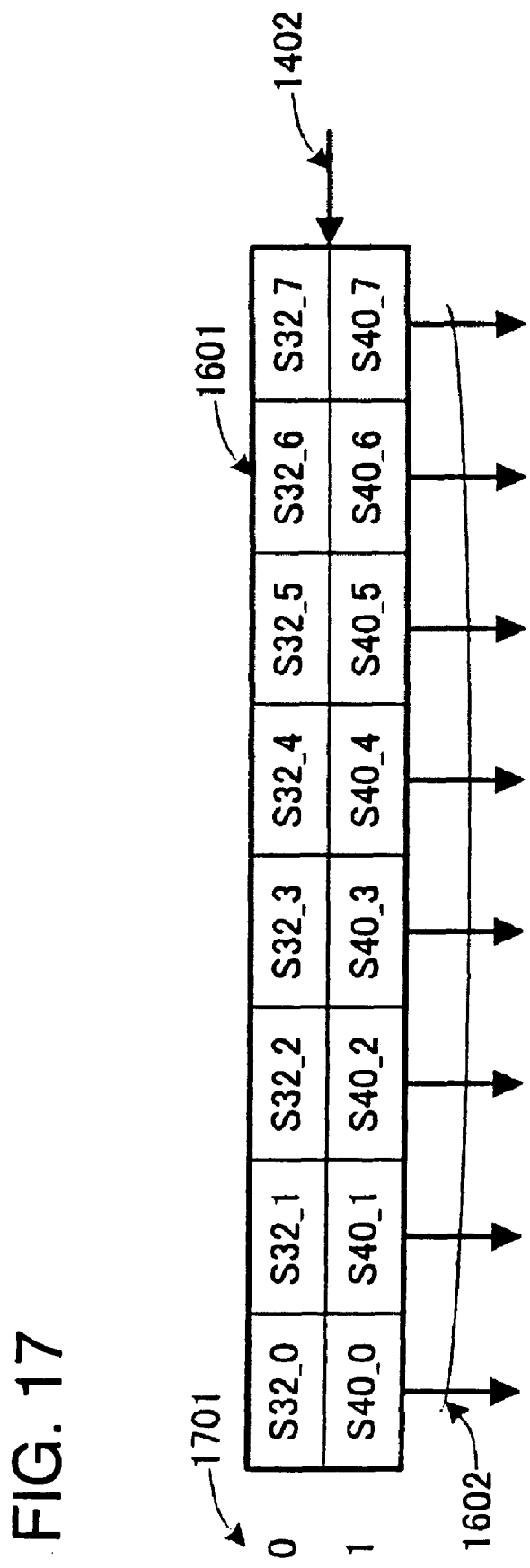
FIG. 17 is a diagram showing an internal configuration of a memory 1601 in the third exemplary embodiment of the present invention.
Figure 18:
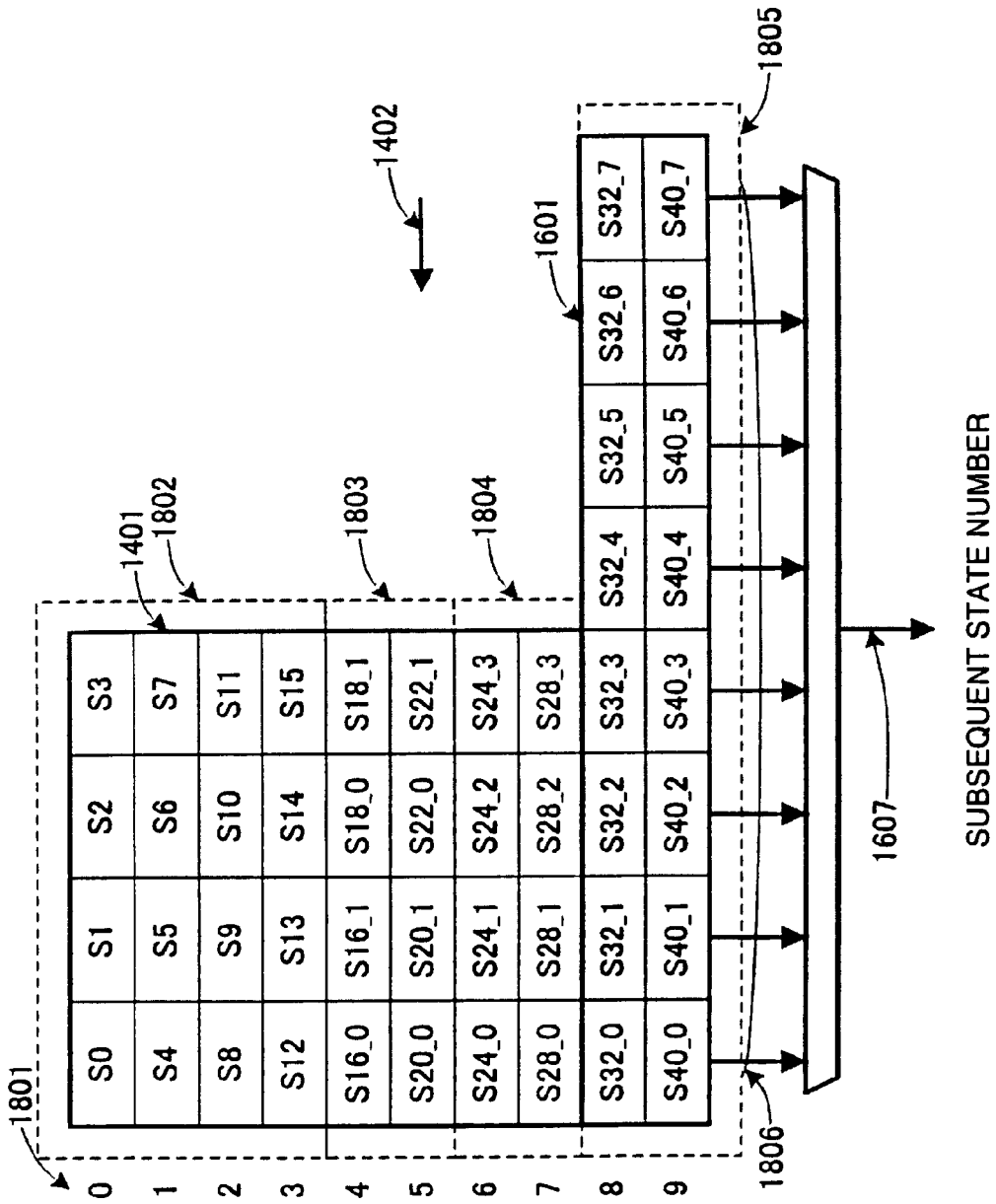
FIG. 18 is a diagram explaining an operation when a memory 1401 and the memory 1601 are combined in the third exemplary embodiment of the present invention.

First, the extended memory 1601 is a synchronous-type memory used specifically for multiple branching, and operates in a similar manner to the synchronous-type memory 1401. In response to input of a signal 1402 (first signal based on a state number) that indicates bits 4 to 2 of a subsequent state number, the extended memory 1601 outputs subsequent state number candidates 1602 in a next cycle. FIG. 16 shows the configuration which outputs 8 subsequent state number candidates 1602. Next, an extended selector 1603 selects one of the 8 subsequent state number candidates 1602 according to an event identification code 1610 of 3 bits, and outputs the selected subsequent state number candidate as a subsequent state number candidate 1604. Further, a selector 1606 (extended subsequent state number selector) selects one of a subsequent state number candidate 1605 based on outputs of the memory 1401 and the subsequent state number candidate 1604 based on the outputs of the extended memory 1601, according to a signal 1608 indicating a highest-order bit 5 of a state number, and outputs the selected subsequent state number candidate as a subsequent state number 1607. Next, a configuration of the extended memory 1601 will be shown in FIG. 17. FIG. 17 shows a case where addition of 2 states each of which can be branched into 8 states is accommodated. The extended memory 1601 operates in a similar manner to a memory in FIG. 15 or the like. When the value of the input 1402 of the subsequent state number is 0, 8 subsequent state number candidates S32_0, S32_1, S32_2, . . . , and S32_7 held in a row corresponding to the value 0 in a column 1701 are output as the subsequent state number candidates 1602. When the value of the input 1402 of the subsequent state number is 1, 8 subsequent state number candidates S40_0, S40_1, S40_2, . . . , and S40_7 held in a row corresponding to the value 1 in the column 1701 are output as the subsequent state number candidates 1602. When the memories 1401 and 1601 are combined, the combined memory can be regarded to operate as the memory having a configuration as shown in FIG. 18. In response to input of high-order 4 bits 1402 of a subsequent state number (first signal based on the state number), values in a row corresponding to a value in a column 1801 which matches the high-order 4 bits of the subsequent state number 1402 are output as subsequent state number candidates 1806. When the subsequent state number 1402 assumes one of values of 0 to 7, the memory 1401 is used, and 4 subsequent state number candidates are output. When the subsequent state number 1402 assumes the value of 8 or 9, the memory 1601 is used, and 8 subsequent state number candidates are output. The selector 1606 makes selection of which one of outputs of these memories 1401 and 1601 is to be used. As a control signal, the highest order bit 1608 of the current state number is used as the control signal.

It is often the case that, even if the number of states indicated in the column 1701 to be accommodated is small, the memory 1601 for multiple branching suffices. Thus, it is more suitable to use registers than a memory for configuring the memory 1601. By combining the memory 1401 of a proper size with one or more registers 1601 as just described, multiple branching can also be accommodated while reducing the output bit width of the memory 1401.

[Fourth Exemplary Embodiment]

FIG. 19 is a block diagram of a state transition management device according to a fourth exemplary embodiment of the present invention. This configuration can further increase the efficiency of the memory in FIG. 16. In the configuration in FIG. 19, only the number of branches that cannot be sufficiently accommodated by the synchronous-type memory 1401 in the configuration in FIG. 14 is accommodated by an extended memory 1901. Referring to FIG. 16, all states having multiple branches are accommodated by the extended memory 1601. Referring to FIG. 19, subsequent state number candidates having multiple branches that can be stored in the memory 1401 are stored in the memory 1401. Only subsequent state number candidates that cannot be sufficiently accommodated by the memory 1401 are loaded in the extended memory 1901. Assume that the configuration in FIG. 19 accommodates 8 branches when the memory 1401 accommodates 4 branches, for example. Then, 4 of 8 subsequent state number candidates are stored in the memory 1401, and the remaining 4 subsequent state number candidates are stored in the memory 1901.

Details of FIG. 19 will be described. First, the extended memory 1901 is a synchronous-type memory that stores a part of concurrently needed subsequent state number candidates which cannot be stored in the memory 1401. Reference numeral 1902 indicates subsequent state number candidates output from the extended memory 1901 in response to input of a subsequent state number 1402. Reference numeral 1903 indicates an extended selector that selects one subsequent state number candidate 1904 from among the subsequent state number candidates 1902 using low-order 2 bits 1910 of an event identification code. Reference numeral 1906 indicates an extended subsequent state number selector that selects one of the subsequent state number candidate 1904 and a subsequent state number candidate 1605 using an event identification code highest-order bit 1911 and a current state number highest-order bit 1908. Selection by the extended subsequent state number selector 1906 is made using a signal that determines in which one of the memories 1901 and 1401 the subsequent state number is stored. In the case of FIG. 19, the logical product obtained by an AND circuit 1912 is used, because a state number of 8 or more (where the highest-order bit of the current state number is 1) and the value of the event code identification code of 4 or more (where the highest-order bit of the event identification code is 1) should be used for the determination.

Figure 20:
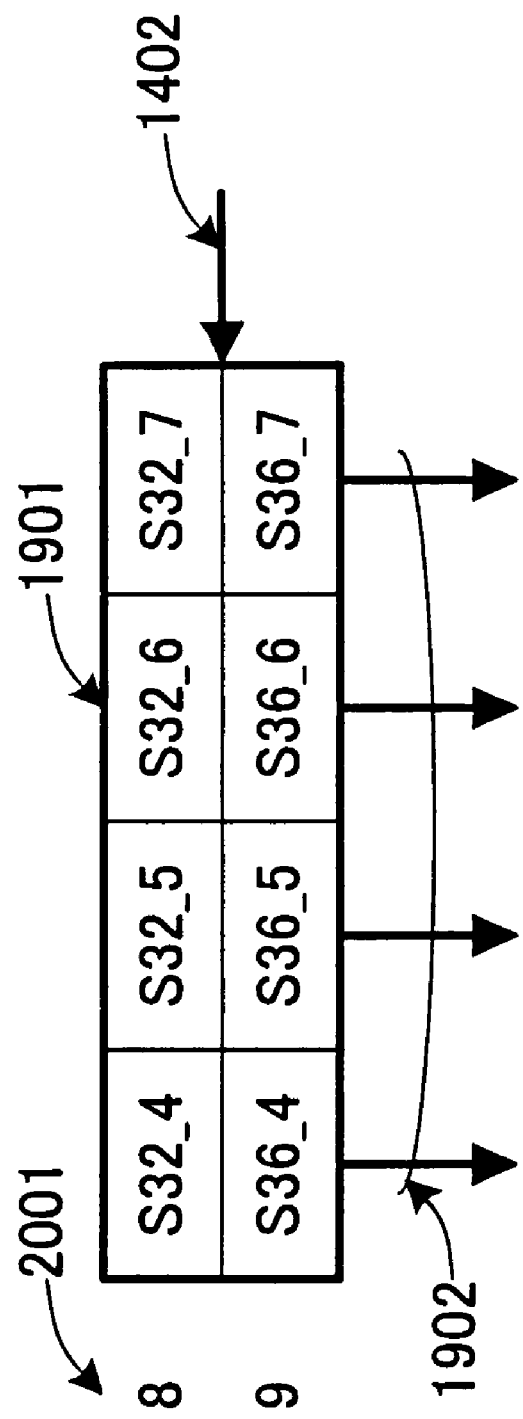
FIG. 20 is a diagram showing an internal configuration of a memory 1901 in the fourth exemplary embodiment of the present invention.
Figure 21:
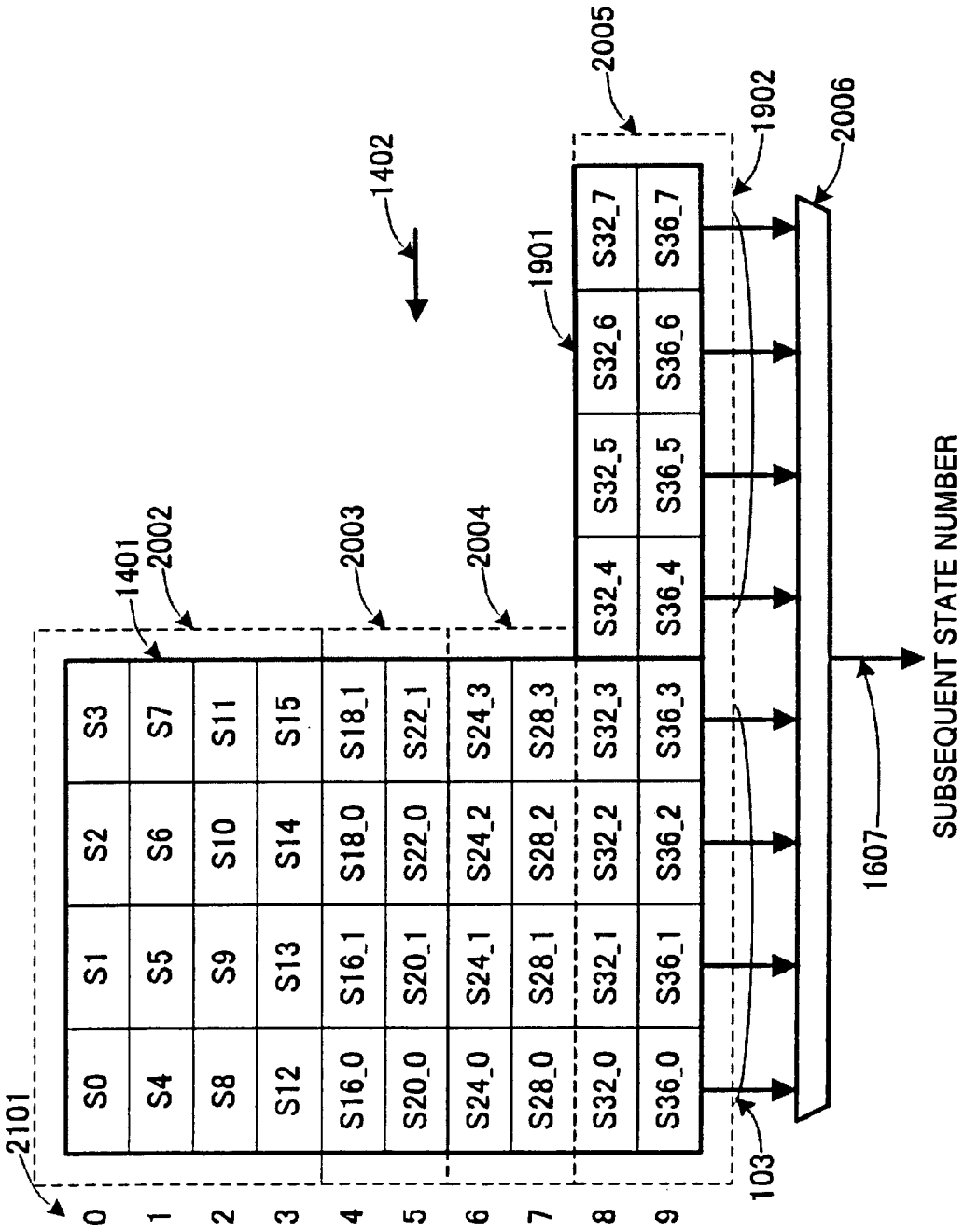
FIG. 21 is a diagram explaining an operation when a memory 1401 and the memory 1901 are combined in the fourth exemplary embodiment of the present invention.

An internal storage system of the extended memory 1901 will be shown in FIG. 20. Only the subsequent state number candidates that cannot be stored in the memory 1401 are stored in the extended memory 1901. Thus, only the subsequent state number candidates for which the value of the event identification code is 4 or more are stored in the extended memory 1901 in the same manner as in the memory 1401. When the input value of the subsequent state number candidate 1402 is 8, S32_4, S32_5, S32_6, and S32_7 which are a part of subsequent state number candidates for a state 32 stored in a row corresponding to the value 8 in a column 2001 are output as the subsequent code number candidates 1902. When the input value of the subsequent state number 1402 is 1, S36_4, S36_5, S36_6, and S36_7 which are a part of subsequent state number candidates for a state 36 stored in a row corresponding to the value 9 in the column 2001 are output as the subsequent code number candidates 1902. FIG. 21 is provided for explaining an operation of a combination of the memories 1401 and 1901, like FIG. 18. Reference numeral 2101 indicates a value corresponding to the subsequent state number 1402. When the value is one of 0 to 7, the operation is the same as that of the memory 1401 alone. 4 subsequent state number candidates in one of rows in blocks 2002, 2003, and 2004 corresponding to the input value of the subsequent state number 1402 are output as subsequent state number candidates 103, and one subsequent state number 1607 is selected by a selector 2006. On the other hand, when the input value of the subsequent state number 1402 is 8 or 9, subsequent state number candidates are selected from a region 2005 having a row corresponding to the value 8 or 9 in the column 2101. 8 subsequent state number candidates, of which the subsequent state number candidates from the memory 1401 are output as the subsequent state candidates 103 and the subsequent state number candidates from the memory 1901 are output as the subsequent state number candidates 1902, are output. Then, one subsequent state number candidate is selected by the selector 2006 to become the subsequent state number 1607.

In either case of FIG. 16 and FIG. 19, the L-character type memory is virtually configured by combining the two memories, as in FIGS. 18 and 21. Considering that each of the memories 1601 and 1901 introduced for multiple branching is configured using one or more registers, the configuration in FIG. 19 having the smaller number of bits thereof can be said to be more desirable in terms of the area.

FIRST EXAMPLE

Figure 12C:
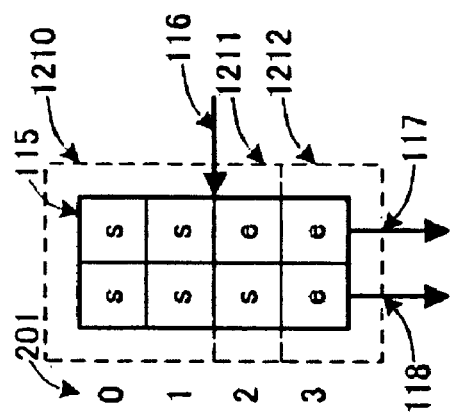
FIGS. 12A, 12B, and 12C are diagrams showing an example of use of the first exemplary embodiment of the present invention.
Figure 12B:
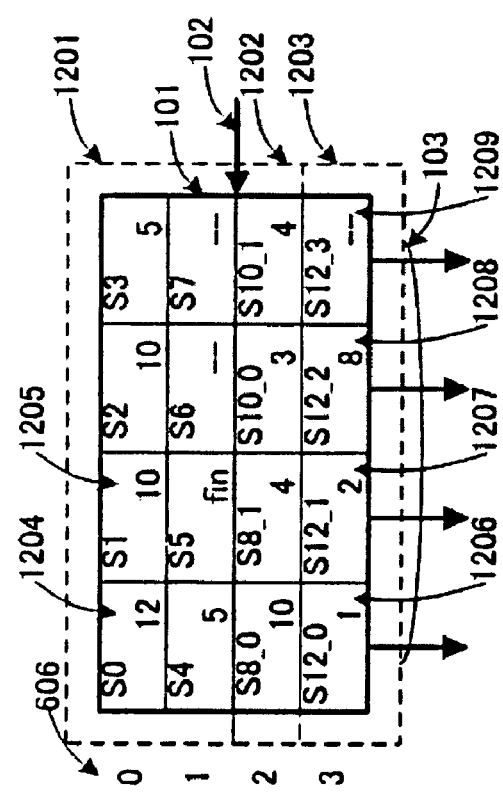
Figure 12A:
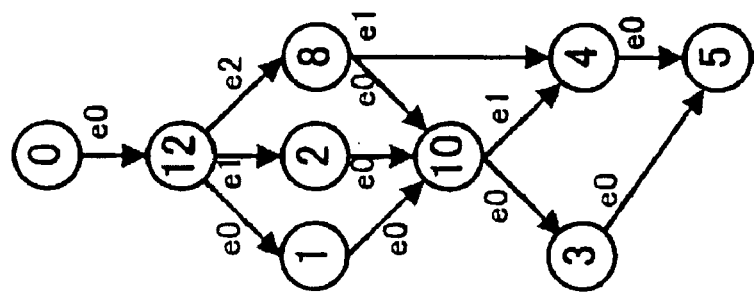

An example of use of the configuration in FIG. 1 of the present invention will be shown, using an example in FIG. 12. FIG. 12A is a state transition diagram of interest. First, state numbers are classified as having no branches, two branches, and branches not more than four branches. Then, it can be seen that there are six state numbers having no branches, two state numbers having two branches, and one state number having four branches. Thus, as shown in a memory in FIG. 12B, 8 states each with no branches in 8 regions in a block 1201, 2 states each having two branches in 4 regions in a block 1202, and 1 state with 4 branches in 4 regions in a block 1203 are needed. The configuration of a selection method specifying unit 115 for that purpose is as shown in FIG. 12C. The range of a block 1210 indicates no branching, the range of a block 1211 indicates 2-way branching, and the range of a block 1212 indicates 4-way branching. Then, a value on the upper left in each region in FIG. 12B indicates a combination of a current state number and an event identification code, and a value on the lower right indicates a subsequent state number. A value S0 on the upper left in a region 1204, for example, indicates the subsequent state number to the current state number of 0. The value of 12 on the lower right indicates that the subsequent state number is 12. Likewise, it is indicated that the subsequent state number for a state 1 in a region 1205 is 10. Each of regions 1206, 1207, 1208, and 1209 is the region that holds the subsequent state number for a state 12. When the event identification code is 0, the region 1206 is used, and the subsequent state number is 1. When the event identification code is 1, the region 1207 is used, and the subsequent state number is 2. When the event identification code is 2, the region 1208 is used, and the subsequent state number is 8. When the event identification code is 3, the region 1209 is used. There is not the case where the region 1209 is used in the state transition diagram in FIG. 12A. Thus, a don't-care mark "_____" is used in the region 1209. The value on the lower right in each region is output as one of subsequent state number candidates 103 at a time of operation. When the state transition diagram in FIG. 12A is implemented in this manner, it can be seen that a total of 16 regions formed of 4 regions in a vertical direction and 4 regions in a horizontal direction suffice, as shown in FIG. 12B.

Figure 13B:
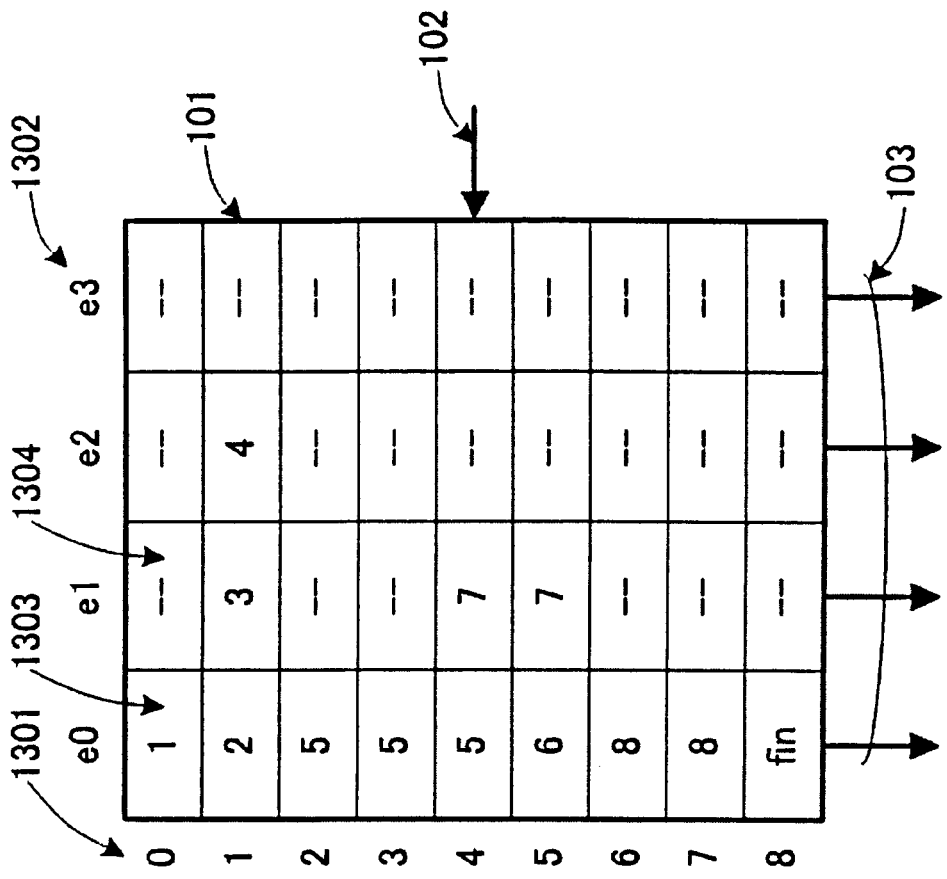
FIGS. 13A and 13B are diagrams showing a case where state transition which is the same as that in FIGS. 12A to 12C is implemented by a conventional configuration.
Figure 13A:
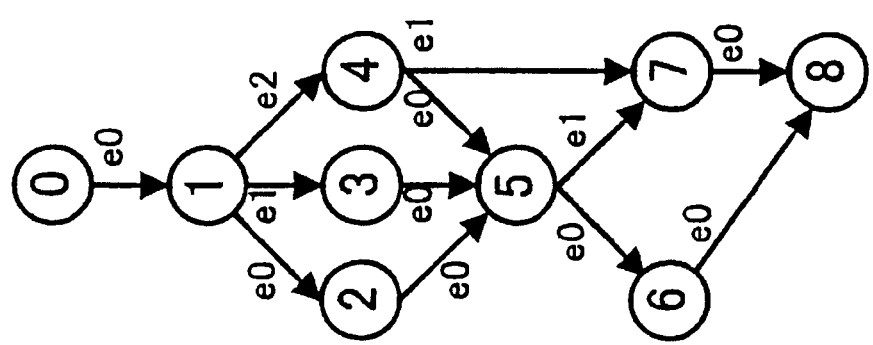

On the other hand, a conventional system will be shown in FIG. 13, for a reference purpose. Referring to FIG. 13A, same state transitions as those in the state transition diagram in FIG. 12 are made. However, different state numbers are assigned in FIG. 13 so that the state numbers are consecutive values starting from 0. FIG. 13B shows the implementation result of the state transition diagram. Each of current state numbers in a column 1301 has 4 branch regions. Thus, 9 rows in a vertical direction, the number of which is the same as the number of states, are necessary. A total of 36 regions are thereby needed. The size of the 36 regions is twice or more than the size of the regions of the states in FIG. 12B of the present invention. Comparison between FIGS. 12B and 13B obviously shows that the number of don't-care marks "_____" which indicate regions that are not used are extremely great in FIG. 13B of the conventional system. On the contrary, the number of the don't-care marks is small in FIG. 12B of the present invention. It can be therefore seen that in the present invention, the state transition rule can be stored in the memory much more efficiently than in the conventional system.

SECOND EXAMPLE

Figure 22:
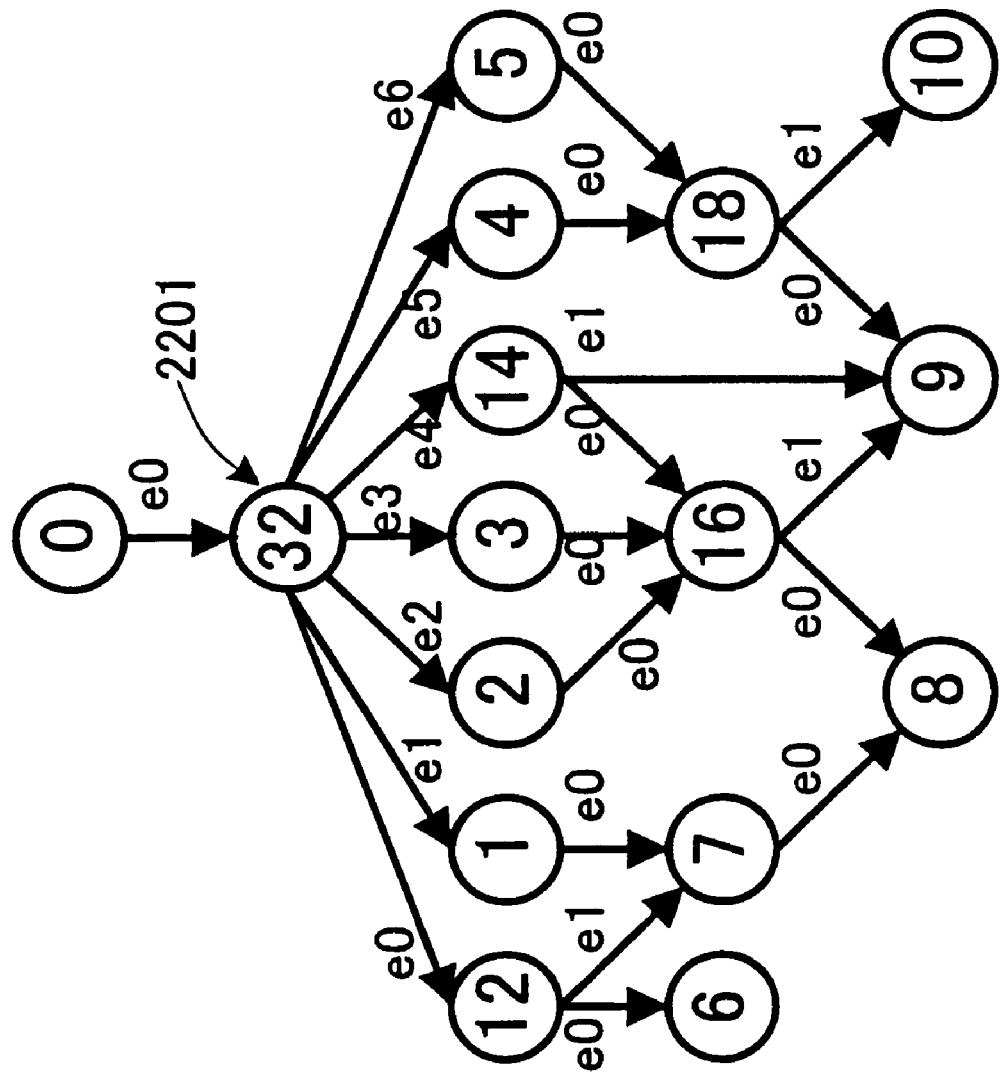
FIG. 22 is a state transition diagram used as an example of use in the third and fourth exemplary embodiment of the present invention.

Next, examples of use of configurations in FIGS. 16 and 19 will be shown. FIG. 22 is a state transition diagram used as an example. A state 32 indicated by reference numeral 2201 is a state having 7 branches, and has a total of 7 subsequent state numbers of 12, 1, 2, 3, 14, 4, and 5. For that reason, in configurations in FIGS. 1 and 14 where 4-way branching is implemented, transition of the state with 7 branches without alteration cannot be implemented. When subsequent state number candidate outputs are increased to 7 candidates in the configurations in FIGS. 1 and 14, the state transition diagram in FIG. 22 can be implemented. However, the bit width of a memory 101 or a memory 1401 will be extremely widened. In such a case, the configurations in FIGS. 16 and 19 are effective.

Figure 23:
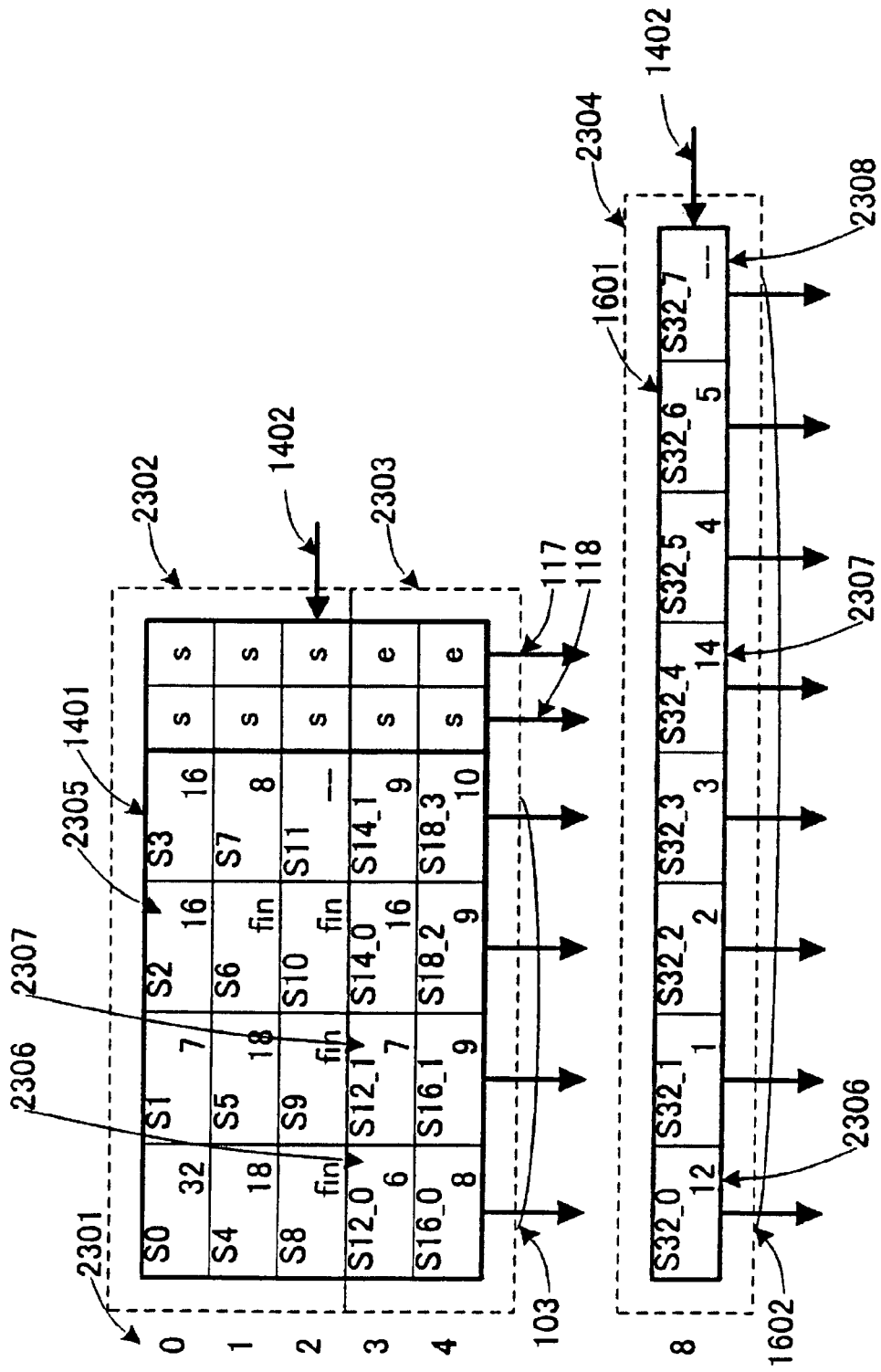
FIG. 23 is a diagram showing insides of the memories 1401 and 1601 when the state transition diagram in FIG. 22 is implemented in the third exemplary embodiment of the present invention.

First, an internal storage system of the memory 1401 and an extended memory 1601 in the configuration in FIG. 16 will be shown in FIG. 23. The storage system of the system memory 1401 is similar to that in the case of FIG. 12. Information on a state with no branches is stored in each region of a block 2302, while information on a state with two branches is stored in each region of a block 2303. In a region indicated by reference numeral 2305, for example, the subsequent state number for a state 2 is stored, as shown in a value S2 on the upper left of the region, and the value of the subsequent state number is 16. Thus, it is shown that the subsequent state to the state 2 is a state 16.

Regions indicated by reference numerals 2306 and 2307 store the subsequent state numbers for a state 12, as shown in S12_0 and S12_1 on the upper left of the regions. It is shown that when the event identification code is 0, the value of 6 stored in the region of S12_0 is the subsequent state number. It is shown that when the event identification code is 1, the value of 7 stored in the region of S12_1 is the subsequent state number. On the other hand, a state 32, which has 7 branches exceeding 4 branches that can be stored in the memory 1401, is stored in the extended memory 1601. In a region indicated by reference numeral 2306, for example, the subsequent state number for a state 32 when the event identification code is 0 is 12, as shown by S32_0 on the upper left of the region. In a region indicated by reference numeral 2307, the subsequent state number for the state 32 when the event identification code is 4 is 14, as shown by S32_4 on the upper left of the region. Since the state 32 has 7 branches, the value in a region, which is indicated by reference numeral 2308 of a block 2304 that accommodates 8 branches and is not used, is indicated by the "don't-care" mark. As described above, the contents of a row corresponding to a value in a column 2301 that matches the input of a subsequent state number 1402 are output as subsequent state number candidates 103 or 1602, though the storage area of the subsequent state number candidates is divided into the memory 1401 and the memory 1601. Then, a selector 1606 in FIG. 16 selects a subsequent state number 1607.

THIRD EXAMPLE

Figure 24:
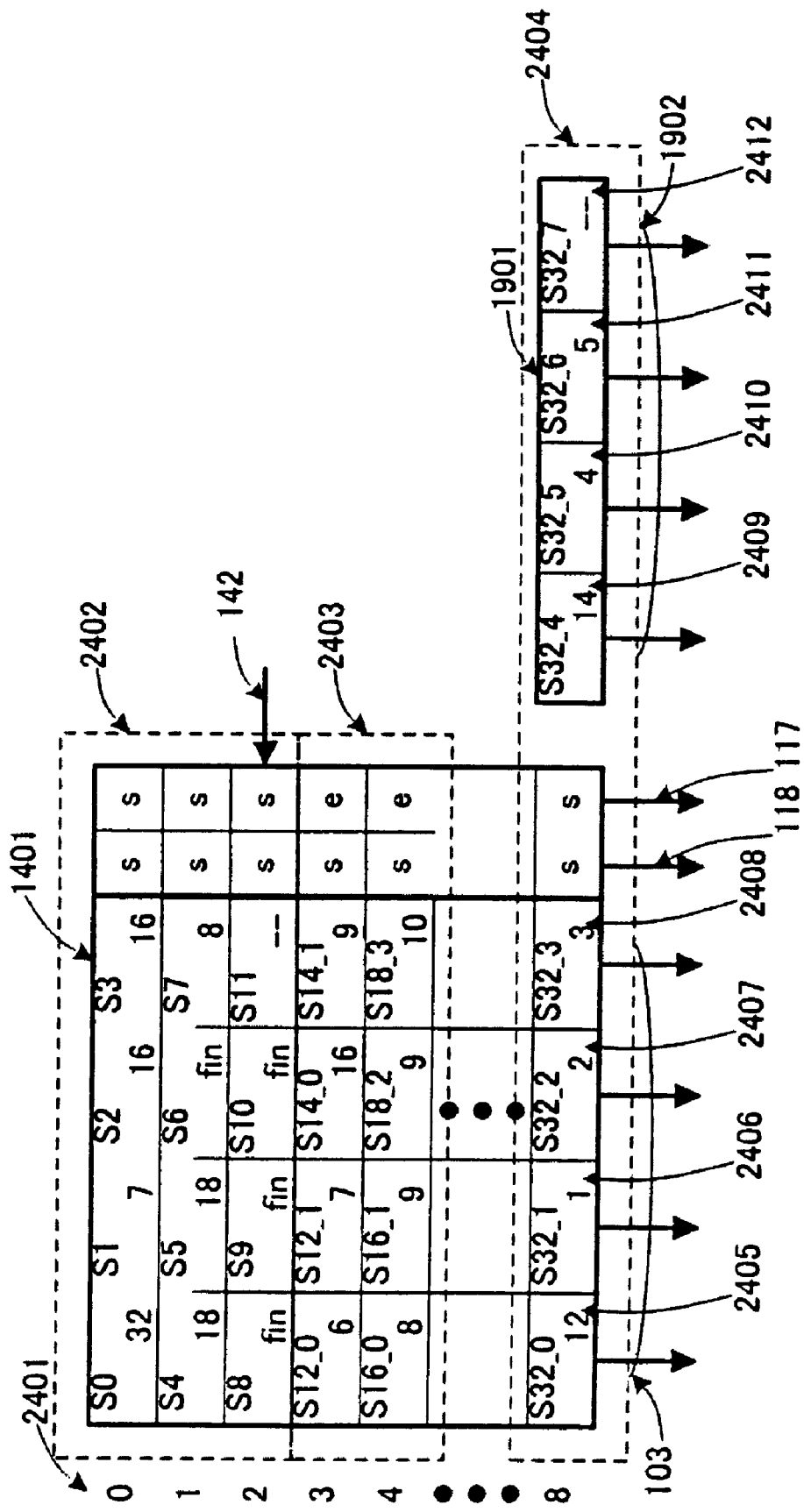
FIG. 24 is a diagram showing insides of the memories 1401 and 1901 when the state transition diagram in FIG. 22 is implemented in the fourth exemplary embodiment of the present invention.
Figure 25B:
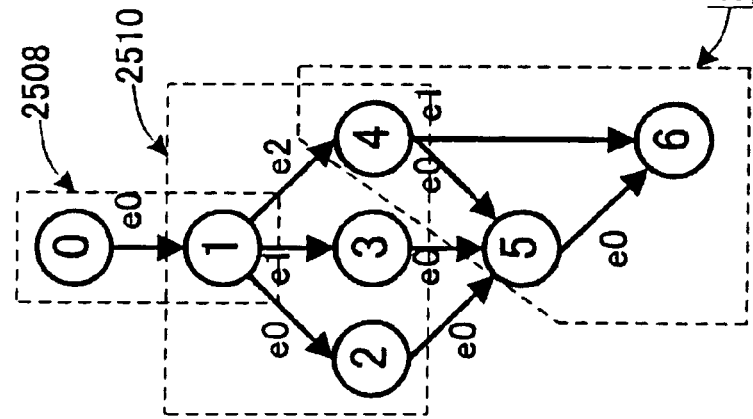
FIG. 25 is a block diagram showing an example of a configuration of a conventional data processing device.
Figure 25A:
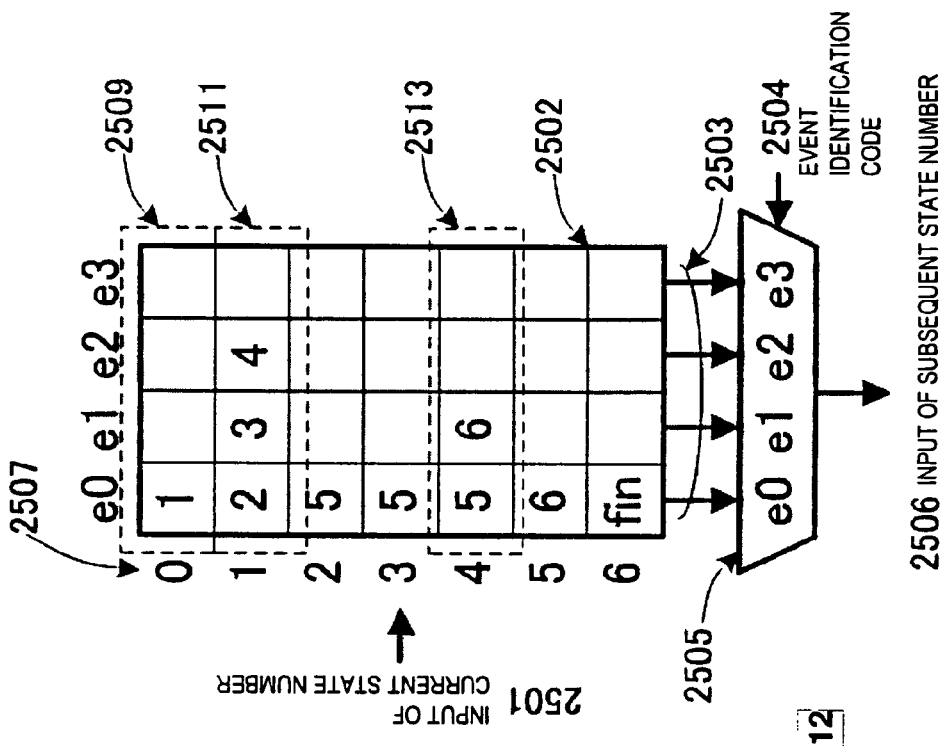

Next, internal storage systems of a memory 1401 and an extended memory 1901 in a configuration in FIG. 19 will be shown in FIG. 24. The storage system of the memory 1401 is similar to that in the case of FIG. 23. However, with respect to a state having the number of branches that cannot not be held in the memory 1401 as well, 4 subsequent state numbers, the number of which is the maximum number of branches for the memory 1401, are stored in the memory 1401. Only the remaining subsequent state numbers that cannot be held in the memory 1401 are stored in the memory 1901. For that reason, the range of a block 2402 that stores a rule without branching is quite the same as the range of a block 2302 in FIG. 23. The range of a block 2403 that stores a rule with 2-way branching is quite the same as the range of a block 2303 in FIG. 23. On the other hand, with respect to a state 32 having 7 branches that cannot be held in the memory 1401, subsequent state numbers where the event identification codes are 0 to 3 are stored in the memory 1401. Subsequent state numbers where the event identification codes are 4 to 7 are stored in the memory 1901. A region 2405 in the memory 1401 is used for storing a subsequent state number for the state 32 having the event code identification code of 0. The subsequent state number of 12 is stored in the region 2405. Likewise, a region 2406 is used for storing a subsequent state number for the state 32 having the event code identification code of 1. The subsequent state number of 1 is stored in the region 2406. A region 2407 is used for storing a subsequent state number for the state 32 having the event code identification code of 2. The subsequent state number of 2 is stored in the region 2407. A region 2408 is used for storing a subsequent state number for the state 32 having the event code identification code of 3. The subsequent state number of 3 is stored in the region 2408. On the other hand, for a subsequent state number having the event code identification code of 4, a region 2409 in the extended memory 1901 is used, and the subsequent state number of 14 is stored in the region 2409. Likewise, a region 2410 is used for a subsequent state number for the state 32 having the event code identification code of 5, a region 2411 is used for a subsequent state number for the state 32 having the event code identification code of 6, and a region 2412 is used for a subsequent state number for the state 32 having the event code identification code of 7. The subsequent state number of 4 is stored in the region 2410. The subsequent state number of 5 is stored in the region 2411. The don't-care mark (for a region that is not used) is stored in the region 2412.

The number of states, the number of branches, the sizes of the memories, the number of bits and bit positions obtained from the state number that have been used so far for the description are shown just as examples, and are not limited to the values described above.

In the present invention, memory mapping is performed as shown in FIGS. 9 and 10, for example, so that one or a plurality of subsequent state number candidates corresponding to each of a plurality of state numbers (current state numbers) are stored in a range (1 word) that can be read in one time access to the memory. Further, in this memory mapping, the number of state numbers (current state numbers) associated with the 1 word may be fixed over the entire memory. Still further, the number of state numbers (current state numbers) associated with the 1 word may be changed for each word, thereby setting the number of state numbers (current state numbers) associated with the 1 word to be different.

The description was given, assuming that each of the first through third signals based on the state number is the signal indicating the part of the bits of the state number. A signal obtained by decoding all bits or some bits of the state signal, for example, may be employed. Further, an event identification signal does not need to be narrowly interpreted, and may be a signal based on a certain event.

Occurrence of an event and state transition can be variously handled. When the event invariably occurs for each 1 clock, for example, the state transition management device may be so configured that transition to a subsequent state is made for each clock. Even when the event does not invariably occur for each clock, the state transition management device may be so configured that no occurrence of the event may be handled as one event and transition to a subsequent state is made for each clock. Further, a circuit that detects occurrence of a certain event (which may be configured using an AND circuit for each event signal, for example) may be provided, and the state transition management device may be so configured that transition to a subsequent state is made when the event occurs.

The above description was given in connection with the embodiments. The present invention is not limited to only the configurations of the embodiments described above, and of course includes various variations and modifications that could be made by those skilled in the art within the scope of the present invention.

As an example of utilization of the present invention, the present invention can be used as a hardware configuration that implements state transition in an architecture in which when a desired application is loaded in a programmable device, the application is separated into a part for state transition and a part for a data bus. In an array-type processor disclosed in Patent Document 1, for example, the present invention can be applied to a state transition management device that manages state transition.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A state transition management device comprising:
a memory which stores a state transition rule and from which a plurality of subsequent state number candidates are read out when the memory receives a first signal based on a state number as an address;
a selection method specifying unit which outputs a selection method specifying signal upon reception of a second signal based on the state number; and
a selection circuit which receives the selection method specifying signal read out from the selection method specifying unit, a signal based on an event, and a third signal based on the state number, and selects a subsequent state number from the plurality of subsequent number candidates.

2. The state transition management device according to claim 1, wherein
each of the first signal and the second signal indicates a part of bits of the state number;
the third signal indicates bits of the state number that are different from parts of bits of the first and second signals; and
the signal based on the event indicates an event identification code.

3. The state transition management device according to claim 1, wherein
the selection circuit includes:
a selection signal generation unit which receives the signal based on the event, the third signal, and the selection method specifying signal, thereby generating a selection signal from the signal based on the event and the third signal, based on the selection method specifying signal; and
a subsequent state number selection unit which selects the subsequent state number from the plurality of subsequent state number candidates, based on the selection signal.

4. The state transition management device according to claim 3, wherein
each of the signal based on the event, the third signal, and the selection method specifying signal is a signal formed of a plurality of bits;
the selection signal generation unit includes a plurality of selection signal selectors connected in parallel;
each of the selection signal selectors is a selector circuit that receives a part of the bits of the signal based on the event, a part of the bits of the third signal, and a part of the bits of the selection method specifying signal and selects and outputs the part of the bits of the signal based on the event or the part of the bits of the third signal, based on the part of the bits of the selection method specifying signal; and
the subsequent state number selection unit includes a plurality of subsequent state number selectors connected in multiple stages, and each of the subsequent state number selectors is a subsequent state number selector that narrows down the plurality of subsequent state number candidates based on one of output signals of the selection signal selectors, and one of the subsequent state number selectors in a final stage selects and outputs the subsequent state number.

5. The state transition management device according to claim 1, wherein
when an address of a specified portion of the memory is supplied by the first signal, the plurality of subsequent state number candidates read out from the memory include subsequent state numbers for a plurality of state numbers; and
the selection circuit selects subsequent state candidates for a current state number from among the subsequent state number candidates for the plurality of state numbers according to the third signal, and selects the subsequent state number to the current state number from among the subsequent state candidates for the current state number according to the signal based on the event.

6. The state transition management device according to claim 1, further comprising:
an extended memory which stores at least a portion of the subsequent state number candidates for the state number having multiple branches and having the subsequent number candidates of a number that exceeds a number of the subsequent state number candidates which can be read out from the memory in one time access;
the selection circuit which selects the subsequent state number from the subsequent state number candidates including the subsequent state number candidates read out from the extended memory.

7. The state transition management device according to claim 6, wherein
the selection circuit further includes:
an extended selector which selects one subsequent state number candidate from the subsequent state number candidates read out from the extended memory based on a part of the bits of the signal based on the event; and
an extended subsequent state number selector which selects the subsequent state number from a subsequent state number candidate selected from the plurality of subsequent state number candidates read out from the memory and the subsequent state number candidate selected by the extended selector.

8. The state transition management device according to claim 1, wherein
the selection method specifying unit is a portion of the memory, and the memory reads out the selection method specifying signal, together with the plurality of subsequent state number candidates when the memory receives the first signal as the address.

9. The state transition management device according to claim 1, wherein
the selection method specifying unit comprises a logic circuit which receives the second signal and outputs the selection method specifying signal.

10. A state transition management method comprising:
providing a state transition management device that uses a memory from which a plurality of subsequent state number candidates are read out when an address based on a current state number is given and selects the subsequent state number from among the plurality of subsequent state number candidates based on an event supplied from an outside when the plurality of subsequent state number candidates are present for the state number; and in case where the address for the state number having the subsequent state number candidates that are small in number is given, the method further comprising:

reading out subsequent state number candidates for a plurality of state numbers from the memory;

narrowing down from the subsequent state number candidates for the plurality of subsequent state numbers to subsequent state number candidates for the current state number, based on at least a part of bits of the current state number; and selecting the subsequent state number from among the subsequent state number candidates for the current state number, based on the event.

* * * * *